United States Patent
Li et al.

(10) Patent No.: US 12,184,330 B2
(45) Date of Patent: Dec. 31, 2024

(54) SIGNAL TRANSMISSION METHOD AND APPARATUS

(71) Applicant: Huawei Technologies Co., Ltd., Shenzhen (CN)

(72) Inventors: Xu Li, Shenzhen (CN); Jingjing Huang, Shenzhen (CN); Jiajin Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 17/986,492

(22) Filed: Nov. 14, 2022

(65) Prior Publication Data

US 2023/0078953 A1    Mar. 16, 2023

Related U.S. Application Data

(63) Continuation of application No. PCT/CN2021/088842, filed on Apr. 22, 2021.

(30) Foreign Application Priority Data

May 15, 2020   (CN) .......................... 202010414389.X

(51) Int. Cl.
*H04B 10/516*   (2013.01)
*H04B 10/116*   (2013.01)
(Continued)

(52) U.S. Cl.
CPC ......... *H04B 10/116* (2013.01); *H04B 10/516* (2013.01); *H04B 10/548* (2013.01); *H04J 14/007* (2013.01); *H04L 27/2628* (2013.01)

(58) Field of Classification Search
CPC .. H04B 10/116; H04B 10/516; H04B 10/548; H04J 14/007; H04L 27/2628
(Continued)

(56) References Cited

U.S. PATENT DOCUMENTS

| | | | |
|---|---|---|---|
| 11,902,073 B2* | 2/2024 | Li | H04L 27/2628 |
| 2014/0029952 A1* | 1/2014 | Liu | H04L 27/2605 |
| | | | 398/115 |

(Continued)

FOREIGN PATENT DOCUMENTS

| | | |
|---|---|---|
| CN | 101369850 A | 2/2009 |
| CN | 104158786 A | 11/2014 |

(Continued)

OTHER PUBLICATIONS

Hussein, A., et al., "Lightweight Multi-carrier Modulation for IoT", Proceedings vol. 10559, Broadband Access Communication Technologies XII; 105590W (2018), Event: SPIE OPTO 2018, Jan. 2018, 10 Pages, San Francisco, California, United States.

*Primary Examiner* — Li Liu
(74) *Attorney, Agent, or Firm* — Slater Matsil, LLP

(57) ABSTRACT

This application provides a signal transmission method and apparatus. The method includes: obtaining, by a transmitter side, a first signal with N points; performing signal separation on the first signal with N points, to obtain two groups of signals (for example, a second signal with N points and a third signal with N points); determining four signals with N/2 points based on the two groups of signals obtained through separation, and combining the four signals with N/2 points, to obtain a to-be-sent signal with 3N/2 points; and sending the signal with 3N/2 points to a receiver side, to enable the receiver to restore the first signal with N points from the received signal with 3N/2 points.

18 Claims, 7 Drawing Sheets

(51) Int. Cl.
*H04B 10/548* (2013.01)
*H04J 14/00* (2006.01)
*H04L 27/26* (2006.01)

(58) Field of Classification Search
USPC ............................... 398/76, 77, 79, 118, 172
See application file for complete search history.

(56) References Cited

U.S. PATENT DOCUMENTS

| | | |
|---|---|---|
| 2014/0056583 A1* | 2/2014 | Giddings ................ H04J 14/00 398/79 |
| 2017/0070298 A1 | 3/2017 | Elgala et al. |
| 2017/0201321 A1 | 7/2017 | Uysal et al. |
| 2018/0241476 A1* | 8/2018 | Johnson ............. H04B 10/6151 |
| 2020/0162159 A1* | 5/2020 | Wei ...................... H04B 10/116 |
| 2021/0119849 A1* | 4/2021 | Kimura ............... H04L 27/2082 |
| 2022/0070864 A1 | 3/2022 | Jeon et al. |
| 2022/0255628 A1 | 8/2022 | Linnartz |
| 2022/0263699 A1 | 8/2022 | Linnartz |

FOREIGN PATENT DOCUMENTS

| | | |
|---|---|---|
| CN | 104618300 A | 5/2015 |
| CN | 105024754 A | 11/2015 |
| CN | 105589506 A | 5/2016 |
| CN | 110870223 A | 3/2020 |
| CN | 110932788 A | 3/2020 |
| EP | 2207316 A1 | 7/2010 |
| JP | 2010130030 A | 6/2010 |

\* cited by examiner

SIGNAL TRANSMISSION METHOD AND APPARATUS

CROSS-REFERENCE TO RELATED APPLICATIONS

This application is a continuation of International Application No. PCT/CN2021/088842, filed on Apr. 22, 2021, which claims priority to Chinese Patent Application No. 202010414389.X, filed on May 15, 2020. The disclosures of the aforementioned applications are hereby incorporated by reference in their entireties.

TECHNICAL FIELD

This application relates to the communication field, and more specifically, to a signal transmission method and apparatus.

BACKGROUND

A visible light communication (VLC) system that uses visible light as a signal carrier operates in an unlicensed frequency band. The system enjoys high security and low energy consumption, and can resist electromagnetic interference, thereby attracting considerable attention in application of next-generation indoor communication. An electrical signal carried on an optical signal for transmission may be an orthogonal frequency division multiplexing (OFDM) signal. In orthogonal frequency division multiplexing modulation of the visible light communication system, a light intensity indicates a baseband signal of an OFDM signal, and the light intensity can only be a positive real number. Therefore, the baseband signal of the OFDM signal needs to be a non-negative real number.

In the existing solution in which an electrical signal is carried on an optical signal for signal transmission, it is ensured that a baseband signal of an OFDM signal is a non-negative real number at the expense of spectral efficiency and/or power consumption. Therefore, how to improve spectral efficiency without increasing power consumption while ensuring that a baseband signal of an OFDM signal is a non-negative real number becomes an urgent problem to be resolved.

SUMMARY

This application provides a signal transmission method and apparatus, to improve spectral efficiency without increasing power consumption while ensuring that a baseband signal of an OFDM signal is a non-negative real number.

According to a first aspect, a signal transmission method is provided. The signal transmission method may be performed by a transmitter, or a chip or a circuit disposed in a transmitter. This is not limited in this application.

It should be noted that a device for sending a signal in this application may be referred to as a transmitter, a transmit end, a sending device, or a first device. A name of the transmit end is not limited in this application, and the transmit end may be referred to as a transmitter below for ease of description.

The signal transmission method includes: obtaining a first signal with N points, where N is a positive even number; determining a second signal with N points and a third signal with N points based on the first signal with N points, where the second signal with N points is used to determine a fourth signal with N/2 points and a fifth signal with N/2 points, and the third signal with N points is used to determine a sixth signal with N/2 points and a seventh signal with N/2 points; determining an eighth signal with N/2 points based on the fourth signal with N/2 points and the sixth signal with N/2 points, and determining a ninth signal with N/2 points based on the fifth signal with N/2 points and the sixth signal with N/2 points; or determining a tenth signal with N/2 points based on the fourth signal with N/2 points and the seventh signal with N/2 points, and determining an eleventh signal with N/2 points based on the fifth signal with N/2 points and the seventh signal with N/2 points; and sending a twelfth signal with 3N/2 points, where the twelfth signal with 3N/2 points includes the eighth signal with N/2 points, the ninth signal with N/2 points, and the seventh signal with N/2 points, or the twelfth signal with 3N/2 points includes the tenth signal with N/2 points, the eleventh signal with N/2 points, and the sixth signal with N/2 points, where the second signal with N points is obtained by setting a signal at an even location in the first signal with N points to 0, and the third signal with N points is obtained by setting a signal at an odd location in the first signal with N points to 0.

In the signal transmission method provided in this application, the transmitter separates the obtained first signal with N points, to obtain two groups of signals; combines the two groups of signals obtained through separation, to obtain the to-be-sent signal with 3N/2 points; and sends the signal with 3N/2 points to a receiver side, to enable the receiver to restore the first signal with N points from the received signal with 3N/2 points. This can improve spectral efficiency of signal transmission without increasing power consumption while ensuring that a baseband signal of a to-be-sent signal (for example, an OFDM signal) is a non-negative real number.

With reference to the first aspect, in some implementations of the first aspect, the method further includes: performing inverse fast Fourier transform IFFT or fast Fourier transform FFT on the second signal with N points, to obtain a thirteenth signal with N points, where the fourth signal with N/2 points is obtained by setting negative parts of the first N/2 points of the thirteenth signal with N points to 0, or by setting positive parts of the last N/2 points of the thirteenth signal with N points to 0 and calculating an absolute value of negative parts of the last N/2 points of the thirteenth signal with N points, and the fifth signal with N/2 points is obtained by setting positive parts of the first N/2 points of the thirteenth signal with N points to 0 and calculating an absolute value of the negative parts of the first N/2 points of the thirteenth signal with N points, or by setting the negative parts of the last N/2 points of the thirteenth signal with N points to 0; and performing IFFT or FFT on the third signal with N points, to obtain a fourteenth signal with N points, where the sixth signal with N/2 points is obtained by setting negative parts of the first N/2 points or last N/2 points of the fourteenth signal with N points to 0, and the seventh signal with N/2 points is obtained by setting positive parts of the first N/2 points or last N/2 points of the fourteenth signal with N points to 0 and calculating an absolute value of the negative parts of the first N/2 points or last N/2 points of the fourteenth signal with N points.

The two groups of signals obtained through separation meet symmetry or antisymmetry after FFT or IFFT. Four signals with N/2 points that are combined to obtain the signal with 3N/2 points are determined based on signals obtained through FFT or IFFT. Because the two groups of signals obtained through separation meet symmetry or antisymmetry after FFT and IFFT, the signal with 3N/2 points can be obtained through combination. This provides a principle that signal separation needs to meet.

With reference to the first aspect, in some implementations of the first aspect, the determining an eighth signal with N/2 points based on the fourth signal with N/2 points and the sixth signal with N/2 points includes: summing up a signal at a location corresponding to the fourth signal with N/2 points and a signal at a location corresponding to the sixth signal with N/2 points, to obtain a signal with N/2 points included in the eighth signal with N/2 points. The determining a ninth signal with N/2 points based on the fifth signal with N/2 points and the sixth signal with N/2 points includes: summing up a signal at a location corresponding to the fifth signal with N/2 points and the signal at the location corresponding to the sixth signal with N/2 points, to obtain a signal with N/2 points included in the ninth signal with N/2 points. The determining a tenth signal with N/2 points based on the fourth signal with N/2 points and the seventh signal with N/2 points includes: summing up the signal at the location corresponding to the fourth signal with N/2 points and a signal at a location corresponding to the seventh signal with N/2 points, to obtain a signal with N/2 points included in the tenth signal with N/2 points. The determining an eleventh signal with N/2 points based on the fifth signal with N/2 points and the seventh signal with N/2 points includes: summing up the signal at the location corresponding to the fifth signal with N/2 points and the signal at the location corresponding to the seventh signal with N/2 points, to obtain a signal with N/2 points included in the eleventh signal with N/2 points.

In a possible implementation, the four signals with N/2 points may be determined by summing up the signals obtained after FFT or IFFT is performed on the two groups of signals obtained through separation. This implementation provides a simple manner to determine the four signals with N/2 points.

According to a second aspect, a signal transmission method is provided. The signal transmission method may be performed by a receiver, or a chip or a circuit disposed in a receiver. This is not limited in this application.

It should be noted that a device for receiving a signal in this application may be referred to as a receiver, a receive end, a receiving device, or a second device. A name of the receive end is not limited in this application, and the receive end may be referred to as a receiver in this application for ease of description.

The signal transmission method includes: obtaining a twelfth signal with 3N/2 points, where the twelfth signal with 3N/2 points includes an eighth signal with N/2 points, a ninth signal with N/2 points, and a seventh signal with N/2 points, or the twelfth signal with 3N/2 points includes a tenth signal with N/2 points, an eleventh signal with N/2 points, and a sixth signal with N/2 points; separating the twelfth signal with 3N/2 points, to obtain a nineteenth signal with N/2 points and a twentieth signal with N points; determining a second signal with N points based on the twentieth signal with N points; determining a third signal with N points based on the twentieth signal with N points, the second signal with N points, and the nineteenth signal with N/2 points; and determining a first signal with N points based on the second signal with N points and the third signal with N points, where N is a positive even number.

In the signal transmission method provided in this application, the receiver side can restore, based on the received signal with 3N/2 points, the first signal with N points that needs to be sent to the receiver side by a transmitter side. This can improve spectral efficiency of signal transmission without increasing power consumption while ensuring that a baseband signal of a to-be-sent signal (for example, an OFDM signal) is a non-negative real number.

With reference to the second aspect, in some implementations of the second aspect, when the twelfth signal with 3N/2 points includes the eighth signal with N/2 points, the ninth signal with N/2 points, and the seventh signal with N/2 points, the separating the twelfth signal with 3N/2 points, to obtain a nineteenth signal with N/2 points and a twentieth signal with N points includes: separating the twelfth signal with 3N/2 points, to obtain a fifteenth signal with N points and the seventh signal with N/2 points, where the fifteenth signal with N points includes the eighth signal with N/2 points and the ninth signal with N/2 points. The determining a second signal with N points based on the twentieth signal with N points includes: determining the second signal with N points based on the fifteenth signal with N points. The determining a third signal with N points based on the twentieth signal with N points, the second signal with N points, and the nineteenth signal with N/2 points includes: determining a fourth signal with N/2 points and/or a fifth signal with N/2 points based on the second signal with N points; determining the sixth signal with N/2 points based on the fourth signal with N/2 points and/or the fifth signal with N/2 points, and the fifteenth signal with N points; and determining the third signal with N points based on the seventh signal with N/2 points and the sixth signal with N/2 points.

Alternatively, when the twelfth signal with 3N/2 points includes the tenth signal with N/2 points, the eleventh signal with N/2 points, and the sixth signal with N/2 points, the separating the twelfth signal with 3N/2 points, to obtain a nineteenth signal with N/2 points and a twentieth signal with N points includes: separating the twelfth signal with 3N/2 points, to obtain a seventeenth signal with N points and the sixth signal with N/2 points, where the seventeenth signal with N points includes the tenth signal with N/2 points and the eleventh signal with N/2 points. The determining a second signal with N points based on the twentieth signal with N points includes: determining the second signal with N points based on the seventeenth signal with N points. The determining a third signal with N points based on the twentieth signal with N points, the second signal with N points, and the nineteenth signal with N/2 points includes: determining a fourth signal with N/2 points and/or a fifth signal with N/2 points based on the second signal with N points; determining the seventh signal with N/2 points based on the fourth signal with N/2 points and/or the fifth signal with N/2 points, and the seventeenth signal with N points; and determining the third signal with N points based on the seventh signal with N/2 points and the sixth signal with N/2 points.

Specifically, the receiver may determine, based on the received signal with 3N/2 points, two groups of signals obtained by separating the first signal with N points, and further restore the first signal with N points based on the two groups of signals. This application provides different combination manners to obtain the signal with 3N/2 points. This can improve flexibility of the solution.

With reference to the second aspect, in some implementations of the second aspect, the determining the second signal with N points based on the fifteenth signal with N points includes: performing IFFT or FFT on the fifteenth signal with N points, to obtain a sixteenth signal with N points; and setting the sixteenth signal with N points at an even location to 0, to obtain the second signal with N points.

With reference to the second aspect, in some implementations of the second aspect, the determining the second signal with N points based on the seventeenth signal with N points includes: performing IFFT or FFT on the seventeenth signal with N points, to obtain an eighteenth signal with N points; and setting the seventeenth signal with N points at an even location to 0, to obtain the second signal with N points.

With reference to the second aspect, in some implementations of the second aspect, the determining the third signal with N points based on the seventh signal with N/2 points and the sixth signal with N/2 points includes: determining a fourteenth signal with N points based on the seventh signal with N/2 points and the sixth signal with N/2 points; and performing IFFT or FFT on the fourteenth signal with N points, to obtain the third signal with N points.

According to a third aspect, a signal transmission apparatus is provided. The signal transmission apparatus includes a processor, configured to implement a function of the transmitter in the method described in the first aspect.

Optionally, the signal transmission apparatus may further include a memory. The memory is coupled to the processor, and the processor is configured to implement the function of the transmitter in the method described in the first aspect.

In a possible implementation, the memory is configured to store program instructions and data. The memory is coupled to the processor. The processor may invoke and execute the program instructions stored in the memory, to implement the function of the transmitter in the method described in the first aspect.

Optionally, the signal transmission apparatus may further include a communication interface. The communication interface is for communication between the signal transmission apparatus for and another device. When the signal transmission apparatus is a transmitter, the transceiver may be a communication interface or an input/output interface.

In a possible design, the signal transmission apparatus includes a processor and a communication interface, configured to implement the function of the transmitter in the method described in the first aspect, and specifically includes: The processor communicates with an external device through the communication interface. The processor is configured to run a computer program, to enable the apparatus to implement any method described in the first aspect.

It may be understood that the external device may be an object other than the processor or an object other than the apparatus.

In another implementation, when the signal transmission apparatus is a chip or a chip system, the communication interface may be an input/output interface, an interface circuit, an output circuit, an input circuit, a pin, a related circuit, or the like in the chip or the chip system. The processor may alternatively be a processing circuit or a logic circuit.

According to a fourth aspect, a signal transmission apparatus is provided. The signal transmission apparatus includes a processor, configured to implement a function of the receiver in the method described in the second aspect.

Optionally, the signal transmission apparatus may further include a memory. The memory is coupled to the processor, and the processor is configured to implement the function of the receiver in the method described in the second aspect.

In a possible implementation, the memory is configured to store program instructions and data. The memory is coupled to the processor. The processor may invoke and execute the program instructions stored in the memory, to implement the function of the receiver in the method described in the second aspect.

Optionally, the signal transmission apparatus may further include a communication interface. The communication interface is for communication between the signal transmission apparatus for and another device. When the signal transmission apparatus is a receiver, the transceiver may be a communication interface or an input/output interface.

In a possible design, the signal transmission apparatus includes a processor and a communication interface, configured to implement the function of the receiver in the method described in the second aspect, and specifically includes: The processor communicates with an external device through the communication interface. The processor is configured to run a computer program, to enable the apparatus to implement any method described in the second aspect.

It may be understood that the external device may be an object other than the processor or an object other than the apparatus.

In another implementation, when the signal transmission apparatus is a chip or a chip system, the communication interface may be an input/output interface, an interface circuit, an output circuit, an input circuit, a pin, a related circuit, or the like in the chip or the chip system. The processor may alternatively be a processing circuit or a logic circuit.

According to a fifth aspect, a computer-readable storage medium is provided, and stores a computer program or instructions. When the computer program or the instructions is/are run on a computer, the method in any one of the first aspect and possible implementations of the first aspect is performed.

According to a sixth aspect, a computer-readable storage medium is provided, and stores a computer program or instructions. When the computer program or the instructions is/are run on a computer, the method in any one of the second aspect and possible implementations of the second aspect is performed.

According to a seventh aspect, a computer program product including instructions is provided. When the instructions are run on a computer, the method in any one of the first aspect and possible implementations of the first aspect is performed.

According to an eighth aspect, a computer program product including instructions is provided. When the instructions are run on a computer, the method in any one of the second aspect and possible implementations of the second aspect is performed.

According to a ninth aspect, an optical signal transmission device is provided, and includes the signal transmission apparatus in the third aspect and the signal transmission apparatus in the fourth aspect.

According to a tenth aspect, a signal transmission apparatus is provided, including:
an input interface (circuit), configured to obtain a first signal with N points, where N is a positive even number; a logic circuit, configured to determine a second signal with N points and a third signal with N points based on the first signal with N points, where the second signal with N points is used to determine a fourth signal with N/2 points and a fifth signal with N/2 points, and the third signal with N points is used to determine a sixth signal with N/2 points and a seventh signal with N/2 points, where the logic circuit is further configured to: determine an eighth signal with N/2 points based on the fourth signal with N/2 points and the sixth signal with N/2 points, and determine a ninth signal with N/2 points based on the fifth signal with N/2 points and the sixth signal with N/2 points; or determine a tenth signal with N/2 points based on the fourth signal with N/2 points and the seventh signal with N/2 points, and determine an eleventh signal with N/2 points based on the fifth signal with N/2 points and the seventh signal with N/2 points; and an output interface (circuit), configured to send a twelfth signal with 3N/2 points. The twelfth signal with 3N/2 points includes the eighth signal with N/2 points, the ninth signal with N/2 points, and the seventh signal with N/2 points, or the twelfth signal with 3N/2 points includes the tenth signal with N/2 points, the eleventh signal with N/2 points, and the sixth signal with N/2 points. The second signal with N points is obtained by setting a signal at an even location in the first signal with N points to 0, and the third signal with N points is obtained by setting a signal at an odd location in the first signal with N points to 0.

With reference to the tenth aspect, in some implementations of the tenth aspect, the logic circuit is further configured to perform inverse fast Fourier transform IFFT or fast Fourier transform FFT on the second signal with N points, to obtain a thirteenth signal with N points.

The fourth signal with N/2 points is obtained by setting negative parts of the first N/2 points of the thirteenth signal with N points to 0, or by setting positive parts of the last N/2 points of the thirteenth signal with N points to 0 and calculating an absolute value of negative parts of the last N/2 points of the thirteenth signal with N points.

The fifth signal with N/2 points is obtained by setting positive parts of the first N/2 points of the thirteenth signal with N points to 0 and calculating an absolute value of the negative parts of the first N/2 points of the thirteenth signal with N points, or by setting the negative parts of the last N/2 points of the thirteenth signal with N points to 0.

With reference to the tenth aspect, in some implementations of the tenth aspect, the logic circuit is further configured to perform IFFT or FFT on the third signal with N points, to obtain a fourteenth signal with N points.

The sixth signal with N/2 points includes negative parts, that are set to 0, of the first N/2 points or last N/2 points of the fourteenth signal with N points and positive parts of the first N/2 points or last N/2 points of the fourteenth signal with N points.

The seventh signal with N/2 points includes the positive parts, that are set to 0, of the first N/2 points or last N/2 points of the fourteenth signal with N points to 0 and an absolute value of the negative parts of the first N/2 points or last N/2 points of the fourteenth signal with N points.

With reference to the tenth aspect, in some implementations of the tenth aspect, that the logic circuit is configured to determine an eighth signal with N/2 points based on the fourth signal with N/2 points and the sixth signal with N/2 points includes: summing up a signal at a location corresponding to the fourth signal with N/2 points and a signal at a location corresponding to the sixth signal with N/2 points, to obtain a signal with N/2 points included in the eighth signal with N/2 points.

The determining a ninth signal with N/2 points based on the fifth signal with N/2 points and the sixth signal with N/2 points includes: summing up a signal at a location corresponding to the fifth signal with N/2 points and the signal at the location corresponding to the sixth signal with N/2 points, to obtain a signal with N/2 points included in the ninth signal with N/2 points.

The determining a tenth signal with N/2 points based on the fourth signal with N/2 points and the seventh signal with N/2 points includes: summing up the signal at the location corresponding to the fourth signal with N/2 points and a signal at a location corresponding to the seventh signal with N/2 points, to obtain a signal with N/2 points included in the tenth signal with N/2 points.

The determining an eleventh signal with N/2 points based on the fifth signal with N/2 points and the seventh signal with N/2 points includes: summing up the signal at the location corresponding to the fifth signal with N/2 points and the signal at the location corresponding to the seventh signal with N/2 points, to obtain a signal with N/2 points included in the eleventh signal with N/2 points.

According to an eleventh aspect, a signal transmission apparatus is provided, including: an input interface (circuit), configured to obtain a twelfth signal with 3N/2 points, where the twelfth signal with 3N/2 points includes an eighth signal with N/2 points, a ninth signal with N/2 points, and a seventh signal with N/2 points; or the twelfth signal with 3N/2 points includes a tenth signal with N/2 points, an eleventh signal with N/2 points, and a sixth signal with N/2 points; and a logic circuit, configured to separate the twelfth signal with 3N/2 points, to obtain a signal with N/2 points and a signal with N points.

The logic circuit is further configured to determine a second signal with N points based on the signal with N points obtained through separation.

The logic circuit is further configured to determine a third signal with N points based on the signal with N points obtained through separation, the second signal with N points, and the signal with N/2 points obtained through separation.

The logic circuit is further configured to determine a first signal with N points based on the second signal with N points and the third signal with N points.

N is a positive even number. With reference to the eleventh aspect, in some implementations of the eleventh aspect, when the twelfth signal with 3N/2 points includes the eighth signal with N/2 points, the ninth signal with N/2 points, and the seventh signal with N/2 points, that the logic circuit is configured to separate the twelfth signal with 3N/2 points, to obtain a signal with N/2 points and a signal with N points includes: the logic circuit is specifically configured to separate the twelfth signal with 3N/2 points, to obtain a fifteenth signal with N points and the seventh signal with N/2 points, where the fifteenth signal with N points includes the eighth signal with N/2 points and the ninth signal with N/2 points.

That the logic circuit is configured to determine a second signal with N points based on the signal with N points obtained through separation includes: the logic circuit is specifically configured to determine the second signal with N points based on the fifteenth signal with N points.

That the logic circuit is configured to determine a third signal with N points based on the signal with N points obtained through separation, the second signal with N points, and the signal with N/2 points obtained through separation includes:

the logic circuit is specifically configured to: determine a fourth signal with N/2 points and/or a fifth signal with N/2 points based on the second signal with N points;

determine the sixth signal with N/2 points based on the fourth signal with N/2 points and/or the fifth signal with N/2 points, and the fifteenth signal with N points; and determine the third signal with N points based on the seventh signal with N/2 points and the sixth signal with N/2 points.

With reference to the eleventh aspect, in some implementations of the eleventh aspect, that the logic circuit is configured to determine the second signal with N points based on the fifteenth signal with N points includes:

the logic circuit is specifically configured to: perform IFFT or FFT on the fifteenth signal with N points, to obtain a sixteenth signal with N points; and set the sixteenth signal with N points at an even location to 0, to obtain the second signal with N points.

With reference to the eleventh aspect, in some implementations of the eleventh aspect, when the twelfth signal with 3N/2 points includes the tenth signal with N/2 points, the eleventh signal with N/2 points, and the sixth signal with N/2 points, that the logic circuit is configured to separate the twelfth signal with 3N/2 points, to obtain a signal with N/2 points and a signal with N points includes: the logic circuit is specifically configured to separate the twelfth signal with 3N/2 points, to obtain a seventeenth signal with N points and the sixth signal with N/2 points, where the seventeenth signal with N points includes the tenth signal with N/2 points and the eleventh signal with N/2 points.

That the logic circuit is configured to determine a second signal with N points based on the signal with N points includes: the logic circuit is specifically configured to determine the second signal with N points based on the seventeenth signal with N points.

That the logic circuit is configured to determine a third signal with N points based on the second signal with N points and the signal with N/2 points includes:

the logic circuit is specifically configured to: determine a fourth signal with N/2 points and/or a fifth signal with N/2 points based on the second signal with N points;

determine the seventh signal with N/2 points based on the fourth signal with N/2 points and/or the fifth signal with N/2 points, and the seventeenth signal with N points; and determine the third signal with N points based on the seventh signal with N/2 points and the sixth signal with N/2 points.

With reference to the eleventh aspect, in some implementations of the eleventh aspect, that the logic circuit is configured to determine the second signal with N points based on the seventeenth signal with N points includes:

the logic circuit is specifically configured to: perform IFFT or FFT on the seventeenth signal with N points, to obtain an eighteenth signal with N points; and set the seventeenth signal with N points at an even location to 0, to obtain the second signal with N points.

With reference to the eleventh aspect, in some implementations of the eleventh aspect, that the logic circuit is configured to determine the third signal with N points based on the seventh signal with N/2 points and the sixth signal with N/2 points includes: the logic circuit is specifically configured to: determine a fourteenth signal with N points based on the seventh signal with N/2 points and the sixth signal with N/2 points; and perform IFFT or FFT on the fourteenth signal with N points, to obtain the third signal with N points.

According to a twelfth aspect, an optical signal transmission device is provided, and includes the signal transmission apparatus in the tenth aspect and the signal transmission apparatus in the eleventh aspect.

Figure 10:
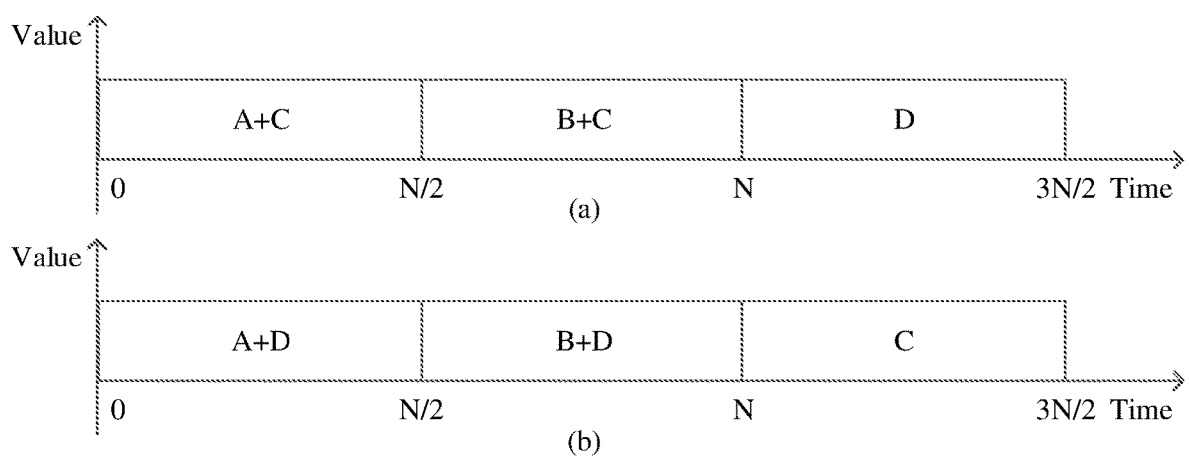
Figure 11:
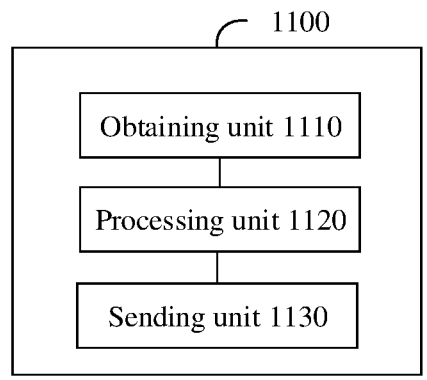
Figure 12:
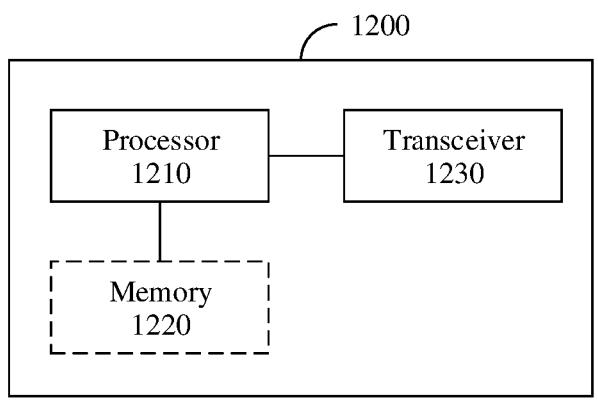
Figure 13:
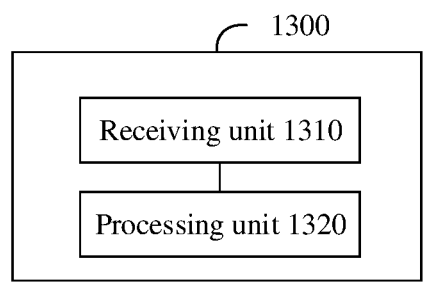
Figure 14:
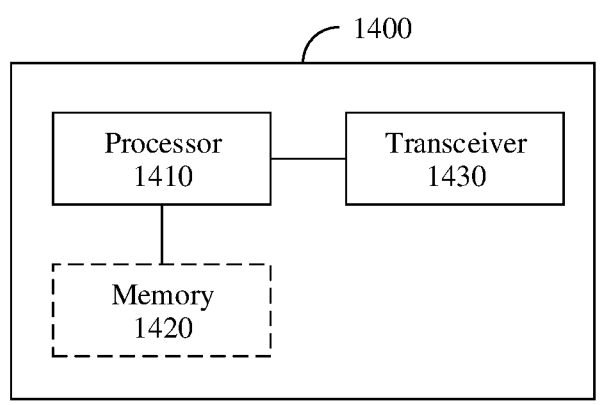

(a) and (b) in FIG. 10 are schematic diagrams of an air interface signal according to an embodiment of this application;

FIG. 11 is a schematic diagram of a signal transmission apparatus 1100 according to this application;

FIG. 12 is a schematic diagram of a structure of a transmitter 1200 applicable to an embodiment of this application;

FIG. 13 is a schematic diagram of a signal transmission apparatus 1300 according to this application; and FIG. 14 is a schematic diagram of a structure of a receiver 1400 applicable to an embodiment of this application.

DETAILED DESCRIPTION OF ILLUSTRATIVE EMBODIMENTS

The following describes technical solutions of this application with reference to the accompanying drawings.

The terms used in the following embodiments are merely intended to describe specific embodiments, but are not intended to limit this application. Terms "one", "a", "the", "the foregoing", "this", and "the one" of singular forms used in this specification and the appended claims of this application are also intended to include expressions such as "one or more", unless otherwise specified in the context clearly. It should further be understood that in the following embodiments of this application, "at least one" and "one or more" mean one, two, or more.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean reference to a same embodiment, instead, they mean "one or more but not all of embodiments", unless otherwise specifically emphasized. Terms "include", "have", and their variants all mean "include but are not limited to", unless otherwise specifically emphasized.

Figure 1:
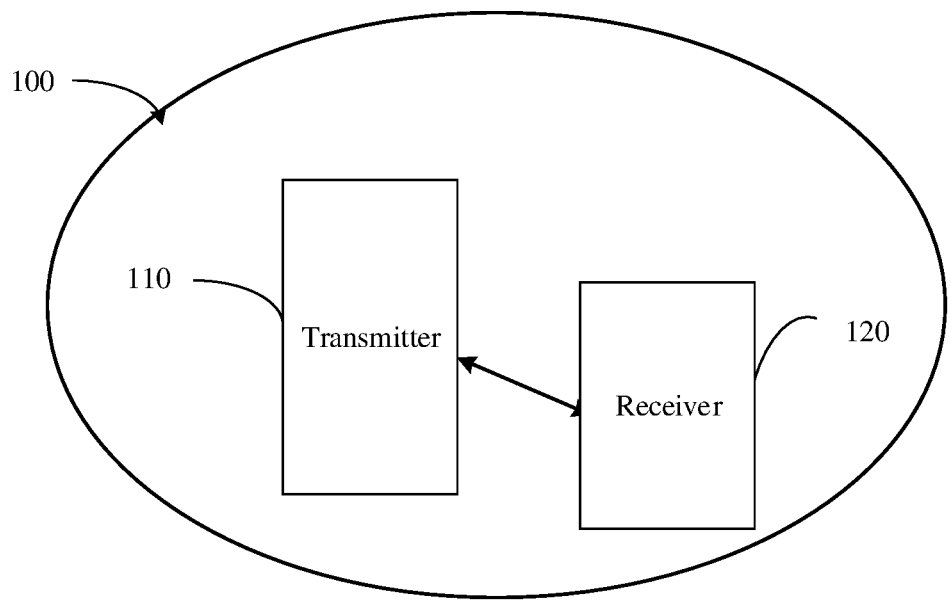
FIG. 1 is a schematic diagram of a signal transmission system 100 applicable to a signal transmission method according to an embodiment of this application.

To better understand embodiments of this application, the following describes a signal transmission system applicable to embodiments of this application by using a signal transmission system shown in FIG. 1 as an example. FIG. 1 is a schematic diagram of a signal transmission system 100 applicable to a signal transmission method according to an embodiment of this application.

As shown in FIG. 1, the signal transmission system 100 may include at least one transmitter, for example, a transmitter 110 shown in FIG. 1. The signal transmission system 100 may further include at least one receiver, for example, a receiver 120 shown in FIG. 1. The transmitter 110 may communicate with the receiver 120 by using a wireless link or a wired link (for example, an optical fiber or an optical cable).

A plurality of wireless links may be configured for each device, for example, the transmitter 110 or the receiver 120. For the transmitter 110 in the signal transmission system 100, the plurality of configured wireless links may include at least one transmit wireless link used to send an optical signal. For the receiver 120 in the optical signal transmission system 100, the plurality of configured wireless links may include at least one receive wireless link used to receive an optical signal.

The transmitter and the receiver in this application may be various terminal devices, for example, user equipment (UE), an access terminal, a subscriber unit, a subscriber station, a mobile console, a mobile station, a remote station, a remote terminal, a mobile device, terminal equipment (TE), a terminal, a wireless communication device, a user agent or a user apparatus, a tablet computer (pad), a handheld device with a wireless communication function, a computing device or another processing device connected to a wireless modem, a vehicle-mounted device, a vehicle-mounted communication module, a wearable device, a terminal device in a 5th generation communication 5G network or a network after 5G, a terminal and a car in intelligent transportation, a home device in smart home, an electric meter reading instrument in a smart grid, a voltage monitoring instrument, an environmental monitoring instrument, a video surveillance instrument in an intelligent security network, a cash register, a machine type communication (MTC) terminal, a laser communication transceiver, an LED optical communication transceiver, a wired optical fiber communication transceiver, an optical module, or the like. This is not limited in this application.

Alternatively, the transmitter and the receiver in this application may be various network devices or access devices in a communication system, that is, devices configured to communicate with a terminal device. For example, the transmitter and the receiver may be an evolved NodeB (eNB or eNodeB) in a long term evolution (LTE) system, a next generation NodeB (gNB) in a 5G system, a transmission reception point (TRP), a relay node, an access point (AP), a macro base station, a micro base station, an indoor AP node, or the like. This is not limited in this application.

It should be understood that FIG. 1 is merely a simplified schematic diagram used as an example for ease of understanding. The signal transmission system 100 may further include another transmitter or another receiver that is not shown in FIG. 1.

To facilitate understanding of embodiments of this application, the following describes some basic concepts in embodiments of this application.

1. Hermitian Symmetry Constraint

A process of generating an OFDM signal carried on an optical signal for transmission mainly includes:

First, N frequency domain signals are generated, and then N time domain signals are generated through inverse fast Fourier transform (IFFT), where N is a positive integer.

In optical communication, the N time domain signals of the OFDM signal need to be non-negative real numbers. Specifically, the non-negative real numbers may be divided into two parts: (1) real number; and (2) non-negative number.

To meet a requirement that the time domain signal is a real number, the N frequency domain signals of the OFDM signal need to meet a Hermitian symmetry (HS) constraint:

$$X_m = X^*_{N-m}$$

$$0 < m < \frac{N}{2}$$

$$X_0 = X_{\frac{N}{2}}$$

$X_m$ is a frequency domain signal whose index value is m in the N frequency domain signals, $X^*_{N-m}$ is a conjugate value of a frequency domain signal whose index value is N−m in the N frequency domain signals, and $$X_{\frac{N}{2}}$$

is a frequency domain signal whose index value is N/2 in the N frequency domain signals.

The HS constraint is widely applied to the field of optical communication, to ensure that a time domain signal of an OFDM signal is a real number. However, the HS constraint cannot ensure that the N time domain signals of the OFDM signal are non-negative numbers.

To further meet a requirement that the N time domain signals of the OFDM signal are non-negative numbers, there are different methods in the field of optical communication, for example, a direct-current-biased optical orthogonal frequency division multiplexing (DCO-OFDM) method, an asymmetrically-clipped optical orthogonal frequency division multiplexing (ACO-OFDM) method, and a unipolar orthogonal frequency division multiplexing (U-OFDM) method.

The following describes the methods for ensuring that the N time domain signals of the OFDM signal are non-negative numbers.

2. Direct-Current-Biased Optical Orthogonal Frequency Division Multiplexing Method In the DCO-OFDM method, a direct current bias is added to the time domain signal of the OFDM signal, to ensure that the time domain signal of the OFDM signal is a non-negative number.

Figure 2:
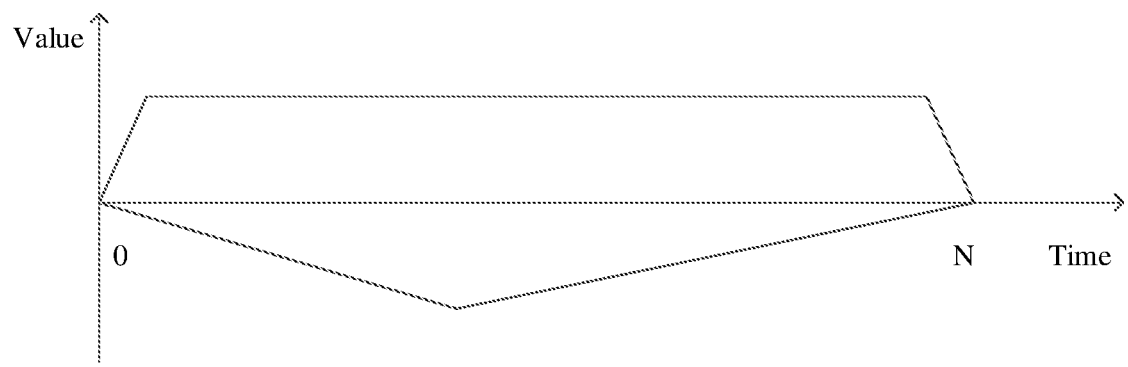
FIG. 2 is a schematic diagram of a time domain signal of an OFDM signal that meets an HS constraint.

Specifically, as shown in FIG. 2, when the N frequency domain signals (for example, X(0), X(1), . . . , X(N−1)) of the OFDM signal meet the HS constraint, the N time domain signals (for example, x(0), x(1), . . . , x(N−1)) of the OFDM signal are real numbers. FIG. 2 is a schematic diagram of a time domain signal of an OFDM signal that meets an HS constraint.

Figure 3:
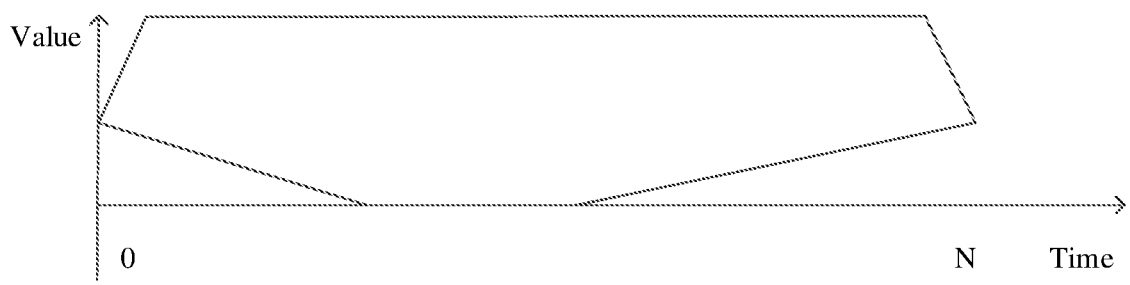
FIG. 3 is a schematic diagram of a time domain signal of an OFDM signal based on a DCO-OFDM method.

FIG. 3 is a schematic diagram of a time domain signal of an OFDM signal based on a DCO-OFDM method.

Because the HS constraint is met, when the OFDM signal is transmitted by using the DCO-OFDM method, spectral efficiency is ½, and a direct current bias is required. As a result, power consumption of signal transmission is increased.

3. Asymmetrically-Clipped Optical Orthogonal Frequency Division Multiplexing Method In the ACO-OFDM method, an even sub-carrier in the frequency domain of the OFDM signal is set to 0, so that the time domain signal of the OFDM signal meets symmetry. Further, based on symmetry, a negative time domain signal is directly set to 0.

Specifically, as shown in FIG. 2, when the N frequency domain signals (for example, X(0), X(1), . . . , X(N−1)) of the OFDM signal meet the HS constraint, the N time domain signals (for example, x(0), x(1), . . . , x(N−1)) of the OFDM signal are real numbers.

Figure 4:
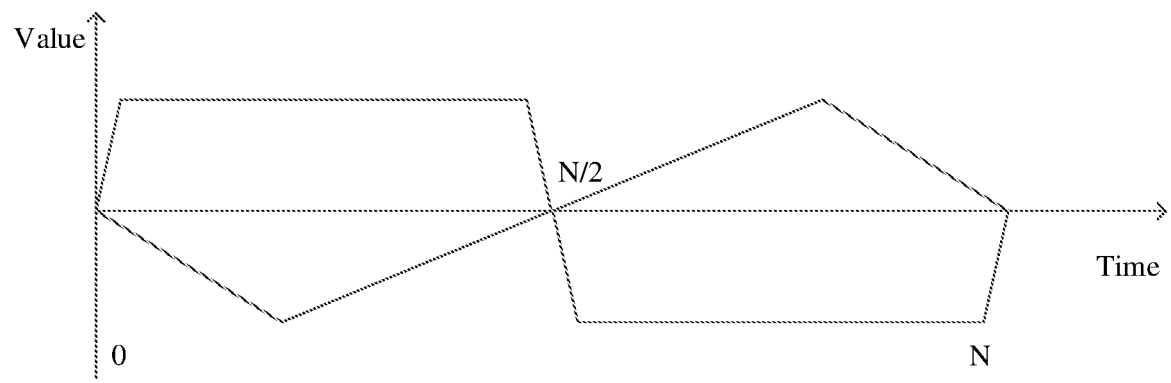
FIG. 4 is a schematic diagram of a time domain signal, that is set to 0, at an even location of an OFDM signal and that meets an HS constraint.

FIG. 4 is a schematic diagram of a time domain signal, that is set to 0, at an even location of an OFDM signal and that meets an HS constraint.

Figure 5:
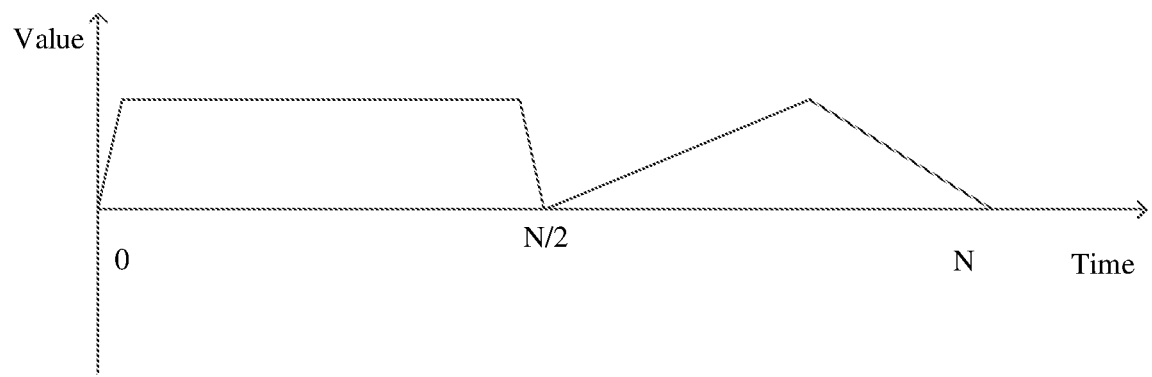
FIG. 5 is a schematic diagram of a time domain signal of an OFDM signal based on an ACO-OFDM method.

FIG. 5 is a schematic diagram of a time domain signal of an OFDM signal based on an ACO-OFDM method.

Due to symmetry, original signal information is not lost. In comparison with the DCO-OFDM method, because a frequency domain signal at an even location of an OFDM signal is set to 0, spectral efficiency is ¼. However, because no direct current bias is required, power consumption is reduced at the expense of half of spectral efficiency.

4. Unipolar Orthogonal Frequency Division Multiplexing Method

In the U-OFDM method, a negative part of a time domain signal of an OFDM signal is reversed and then placed at the end of the time domain signal of the OFDM signal for transmission.

Specifically, as shown in FIG. 2, when the N frequency domain signals (for example, X(0), X(1), . . . , X(N−1)) of the OFDM signal meet the HS constraint, the N time domain signals (for example, x(0), x(1), . . . , x(N−1)) of the OFDM signal are real numbers.

Figure 6:
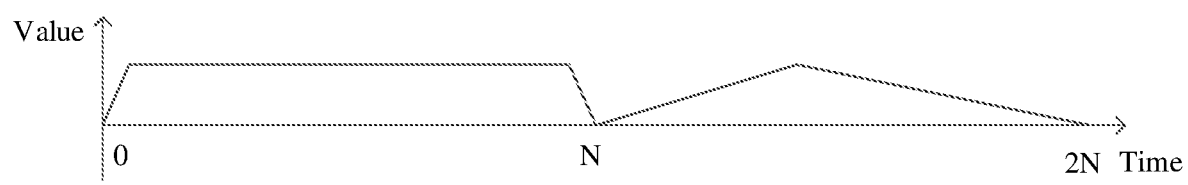
FIG. 6 is a schematic diagram of a time domain signal of an OFDM signal based on a U-OFDM method.

FIG. 6 is a schematic diagram of a time domain signal of an OFDM signal based on a U-OFDM method.

Compared with the DCO-OFDM method, the U-OFDM method doubles time with spectral efficiency of ¼. In other words, half of time efficiency is decreased, which is equivalent to decreasing half of spectral efficiency. However, because no direct current bias is required, power consumption is reduced.

As described above, a signal transmitted in the visible light field needs to be a non-negative real number. To meet this requirement, in the DCO-OFDM method, signal transmission is implemented by using a direct current bias, and spectral efficiency is ½. However, because the direct current bias is required, power consumption is increased. In the ACO-OFDM method and the U-OFDM method, although a direct current bias is not required and power consumption is reduced, spectral efficiency is ¼. In other words, the several methods for ensuring that the N time domain signals of the OFDM signal are non-negative real numbers have disadvantages of high power consumption and/or low spectral efficiency. To improve spectral efficiency without increasing power consumption while ensuring that a baseband signal of an OFDM signal is a non-negative real number, this application provides a signal transmission method. A new air interface signal transmission waveform is designed without a direct current bias, to improve spectral efficiency.

In addition, to facilitate understanding of embodiments of this application, the following several descriptions are provided.

First, in this application, "being used to indicate" may include "being used to directly indicate" and "being used to indirectly indicate". When a piece of indication information is described as being used to indicate A, the indication information may be used to directly indicate A or used to indirectly indicate A, but it does not necessarily mean that the indication information includes A.

Information indicated by the indication information is referred to as to-be-indicated information. In a specific implementation process, there are a plurality of manners of indicating the to-be-indicated information, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may alternatively be indicated based on an arrangement sequence of a plurality of pieces of information that is pre-agreed on (for example, stipulated in a protocol), to reduce indication overheads to some extent. In addition, a common part of all pieces of information may further be identified and indicated in a unified manner, to reduce indication overheads caused by separately indicating same information.

Second, "first", "second", and various numerical numbers (for example, "1" and "2") in this application are merely used to distinguish between objects for ease of description, but are not intended to limit the scope of embodiments of this application. For example, different signals are distinguished.

Third, in this application, "preset" may include "indicated by a transmit by using signaling" or "predefined", for example, "defined in a protocol". "Pre-definition" may be implemented by prestoring corresponding code or a corresponding table in a device (for example, including a transmitter or a receiver), or in another manner that may be used to indicate related information. A specific implementation is not limited in this application.

Fourth, "being stored" in embodiments of this application may be "being stored in one or more memories". The one or more memories may be separately disposed, or may be integrated into an encoder, a translator, a processor, or a communication apparatus. Alternatively, a part of the one or more memories may be separately disposed, and a part of the one or more memories are integrated into a translator, a processor, or a communication apparatus. A type of the memory may be a storage medium in any form. This is not limited in this application.

The following describes in detail the signal transmission method provided in embodiments of this application with reference to the accompanying drawings.

It should be understood that the signal transmission method provided in embodiments of this application may be applied to the signal transmission system 100 shown in FIG. 1. The signal transmission system may include at least one transmitter and at least one receiver. The transmitter may communicate with the receiver by using an optical fiber.

It should further be understood that a specific structure of an entity for performing the method provided in embodiments of this application is not specially limited in the following embodiments, provided that a program that records code for the method provided in embodiments of this application can be run to perform communication according to the method provided in embodiments of this application. For example, the method provided in embodiments of this application may be performed by a transmitter and a receiver, or a functional module in the transmitter and the receiver that can execute the program.

Without loss of generality, the following describes in detail the signal transmission method provided in embodiments of this application by using interaction between the transmitter and the receiver as an example.

Figure 7A:
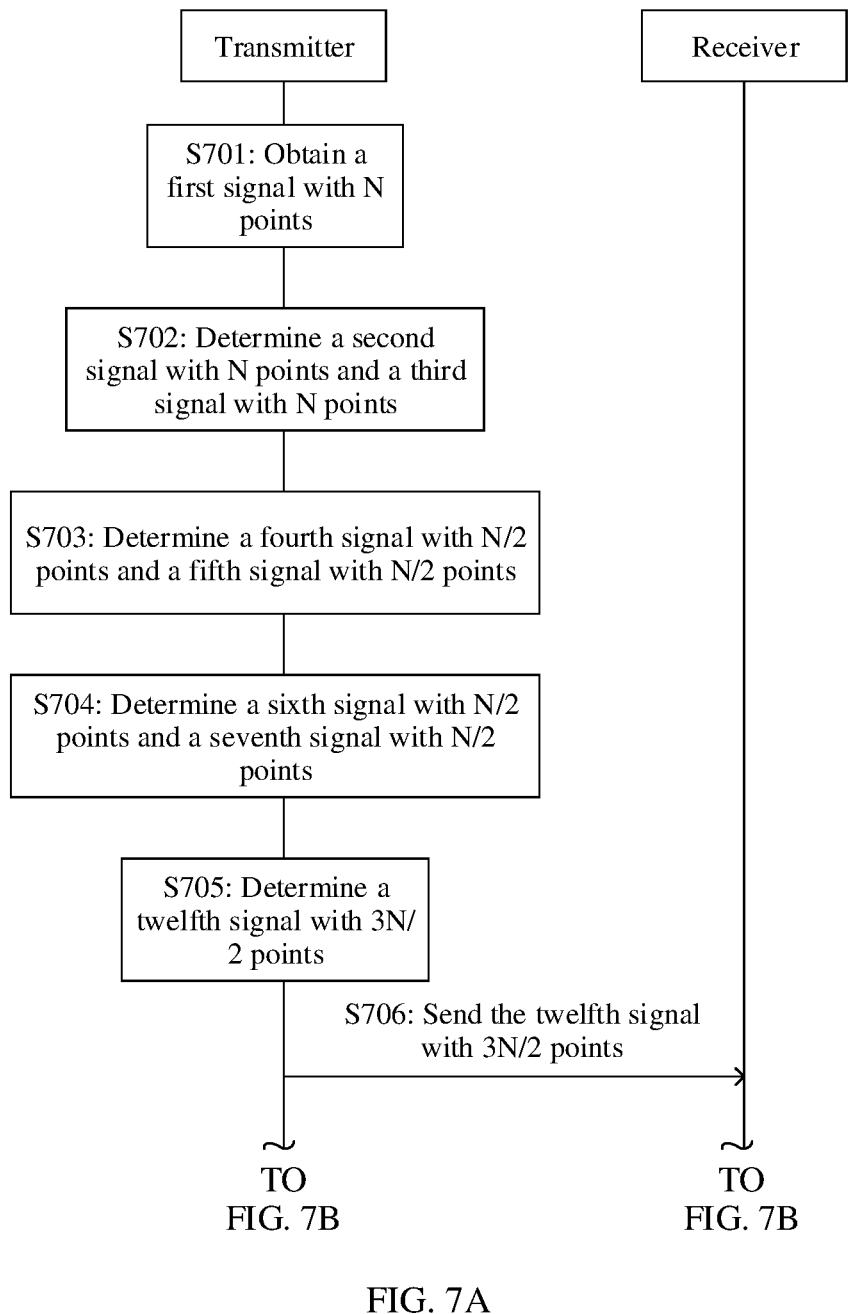
FIG. 7A and FIG. 7B are a schematic flowchart of a signal transmission method according to this application.
Figure 7B:
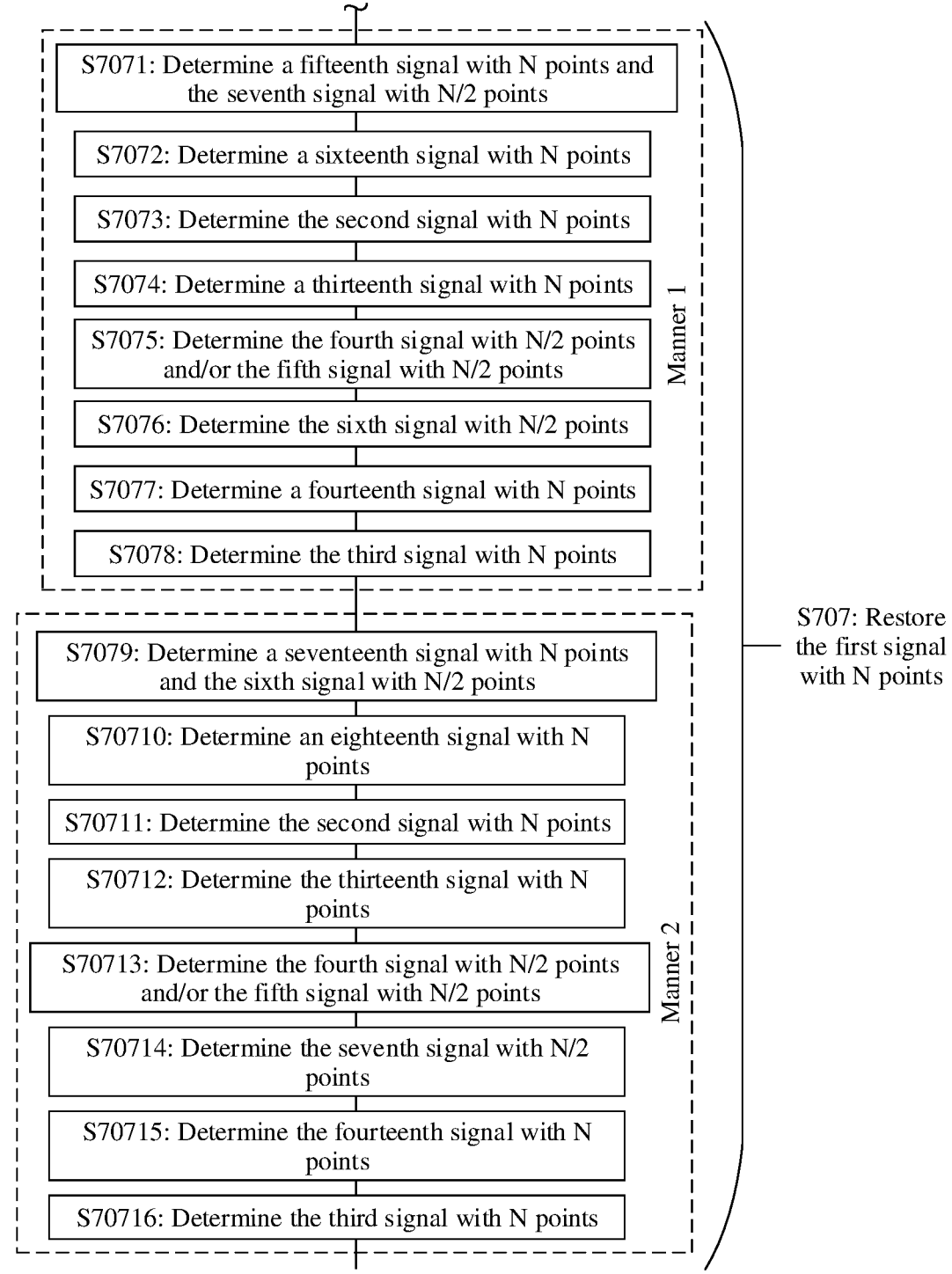

FIG. 7A and FIG. 7B are a schematic flowchart of a signal transmission method according to this application. The method is performed by a transmitter and a receiver.

In the signal transmission method, the transmitter side is mainly configured to:

(1) obtain a first signal with N points, where N is a positive even number;

(2) for the first signal with N points, perform odd and even index elements separation, to obtain a second signal with N points (a signal at an odd location) and a third signal with N points (a signal at an even location);

(3) perform IFFT or FFT on the second signal with N points obtained through separation, to obtain a thirteenth signal with N points, and perform IFFT or FFT on the third signal with N points obtained through separation, to obtain a fourteenth signal with N points;

(4) determine a fourth signal with N/2 points and a fifth signal with N/2 points based on the thirteenth signal with N points, and determine a sixth signal with N/2 points and a seventh signal with N/2 points based on the fourteenth signal with N points;

(5) mix the fourth signal with N/2 points, the fifth signal with N/2 points, the sixth signal with N/2 points, and the seventh signal with N/2 points, to obtain an eighth signal with N/2 points and a ninth signal with N/2 points, or obtain a tenth signal with N/2 points and an eleventh signal with N/2 points; and (6) send a twelfth signal with 3N/2 points to the receiver, where the twelfth signal with 3N/2 points includes the eighth signal with N/2 points, the ninth signal with N/2 points, and the seventh signal with N/2 points, or the twelfth signal with 3N/2 points includes the tenth signal with N/2 points, the eleventh signal with N/2 points, and the sixth signal with N/2 points.

In the signal transmission method, the receiver side is mainly configured to:

(1) obtain a twelfth signal with 3N/2 points;

(2) separate the twelfth signal with 3N/2 points, to obtain a fifteenth signal with N points and the seventh signal with N/2 points, or obtain a seventeenth signal with N points and the sixth signal with N/2 points;

(3) perform IFFT or FFT on the fifteenth signal with N points or the seventeenth signal with N points, and set the fifteenth signal with N points or the seventeenth signal with N points to 0, to obtain the second signal with N points;

(4) perform IFFT or FFT on the second signal with N points, to determine the fourth signal with N/2 points and/or the fifth signal with N/2 points;

(5) determine the third signal with N points based on the fourth signal with N/2 points and/or the fifth signal with N/2 points, and the seventh signal with N/2 points, or based on the fourth signal with N/2 points and/or the fifth signal with N/2 points, and the sixth signal with N/2 points; and (6) restore the first signal with N points based on the second signal with N points and the third signal with N points.

The foregoing briefly describes steps performed by the transmitter and the receiver in embodiments of this application. The following describes in detail an execution manner of each step with reference to FIG. 7A and FIG. 7B.

The signal transmission method at least includes some of the following steps.

S701: Obtain the first signal with N points.

Optionally, that the transmitter obtains the first signal with N points may be receiving a to-be-transmitted first signal with N points that is externally input.

Optionally, that the transmitter obtains the first signal with N points may be obtaining a signal by deleting at least one point from or adding a signal with at least one point to a to-be-transmitted signal with N1 points that is externally input.

For example, if the transmitter receives a to-be-transmitted signal with N1 points (N1 is a positive odd number) that is externally input, the transmitter may delete a signal with an odd point from the signal with N1 points, to obtain the first signal with N points; or add a signal with an odd point to the signal with N1 points, to obtain the first signal with N points.

For another example, if the transmitter receives a to-be-transmitted signal with N1 points (N1 is a positive even number) that is externally input, the transmitter may delete a signal with an even point from the signal with N1 points, to obtain the first signal with N points; or add a signal with an even point to the signal with N1 points, to obtain the first signal with N points.

It should be noted that, in this embodiment of this application, a location of a signal added or deleted by the transmitter is not limited, and a manner of adding or deleting a signal is not limited either.

Optionally, that the transmitter obtains the first signal with N points may be performing odd and even index elements separation on a received signal with 2N points, to obtain a first signal with N points at an add location or at an even location.

Optionally, that the transmitter obtains the first signal with N points may be performing signal separation on a received signal with N2 points, to obtain one group of signals in a plurality of groups of signals.

It should be understood that the foregoing is merely an example for describing a manner of obtaining the first signal with N points, and does not constitute any limitation on the protection scope of this application. In this embodiment of this application, the transmitter may alternatively obtain the first signal with N points in another manner.

N is a positive even number. For ease of description, the following uses an example in which the first signal with N points is a to-be-transmitted first signal with N points that is externally input, and other steps performed by the transmitter after the first signal with N points is obtained are similar to steps performed by the transmitter after the to-be-transmitted first signal with N points that is externally input is received. Details are not described again in this application.

In a possible implementation, a first frequency domain signal with N points of an OFDM signal is input.

In another possible implementation, a first time domain signal with N points of an OFDM signal is input.

It should be noted that a specific type of the first signal with N points in this embodiment of this application is not limited. The first signal with N points may be an OFDM signal or another signal that is similar to an OFDM signal and that meets symmetry.

However, for ease of description, in this application, an example in which the input first signal with N points is a first frequency domain signal with N points of an OFDM signal is used for description. When the input first signal with N points is a first time domain signal with N points of an OFDM signal or another signal similar to an OFDM signal, a processing process is similar. Details are not described in this application.

For example, the first frequency domain signal with N points (for example, X(0), X(1), . . . , X(N−1)) of the OFDM signal is input to the transmitter.

S702: Determine the second signal with N points and the third signal with N points based on the first signal with N points.

A signal with N points included in the second signal with N points is obtained by setting a signal at an even location in the first signal with N points to 0, and a signal with N points included in the third signal with N points is obtained by setting a signal at an odd location in the first signal with N points to 0.

For example, that a signal with N points included in the second signal with N points is obtained by setting a signal at an even location in the first signal with N points to 0 includes:

a signal with N points included in the second signal with N points includes a signal, that is set to 0, at an even location in the first signal with N points and a signal at an odd location.

For example, that a signal with N points included in the third signal with N points is obtained by setting a signal at an odd location in the first signal with N points to 0 includes:

a signal with N points included in the third signal with N points includes a signal, that is set to 0, at an odd location in the first signal with N points and a signal at an even location.

Specifically, the second signal with N points is used to determine the fourth signal with N/2 points and the fifth signal with N/2 points, and the third signal with N points is used to determine the sixth signal with N/2 points and the seventh signal with N/2 points. With reference to step S703 and step S704, the following describes in detail a manner of determining and obtaining the fourth signal with N/2 points, the fifth signal with N/2 points, the sixth signal with N/2 points, and the seventh signal with N/2 points. Details are not described herein.

Optionally, the second signal with N points may also be referred to as a signal with N points at an odd location, and the third signal with N points may also be referred to as a signal with N points at an even location.

For example, the second signal with N points and the third signal with N points are described by using an example in which the input first signal with N points is a first frequency domain signal with N points (for example, X(0), X(1), . . . , X(N−1)).

Odd and even index elements separation is performed on the first frequency domain signal with N points of the OFDM signal that is input to the transmitter, to obtain a frequency domain signal with N points at an odd location: 0, X(1), 0, X(3), . . . , 0, X(N−1). It may be understood as that, based on the frequency domain signal with N points of the OFDM signal, a frequency domain signal with N/2 points at an even location is set to 0, and a frequency domain signal with N/2 points included in the frequency domain signal with N points at an odd location of the OFDM signal remains unchanged, to obtain the frequency domain signal with N points at an odd location.

Similarly, odd and even index elements separation is performed on the first frequency domain signal with N points of the OFDM signal that is input to the transmitter, to obtain a frequency domain signal with N points at an even location: X(0), 0, X(2), 0, . . . , X(N−2), 0. It may be understood as that, based on the frequency domain signal with N points of the OFDM signal, a frequency domain signal with N/2 points at an odd location is set to 0, and a frequency domain signal with N/2 points included in the frequency domain signal with N points at an even location of the OFDM signal remains unchanged, to obtain the frequency domain signal with N points at an even location.

Further, for ease of understanding, the following uses a specific example to describe how to obtain the frequency domain signal with N points at an odd location and the frequency domain signal with N points at an even location based on the input first frequency domain signal with N points of the OFDM signal.

For example, as shown in Table 1, a frequency domain signal with eight points (for example, X(0), X(1), . . . , X(N−1)) of the OFDM signal is input to the transmitter.

TABLE 1

| First signal with N points, where N = 8 | | | | | | | |
|---|---|---|---|---|---|---|---|
| 0 | −3 − j | −3 + j | −i + 3j | 0 | −i − 3j | −3 − j | −3 + j |

As shown in Table 2, after odd and even index elements separation, a frequency domain signal with eight points at an odd location is 0, X(1), 0, X(3), . . . , 0, X(N−1).

TABLE 2

| Second signal with N points, where N = 8 | | | | | | | |
|---|---|---|---|---|---|---|---|
| 0 | −3 − j | 0 | −1 + 3j | 0 | −1 − 3j | 0 | −3 + j |

As shown in Table 3, after odd and even index elements separation, a frequency domain signal with eight points at an odd location is X(0), 0, X(2), 0, . . . , X(N−2), 0.

TABLE 3

| Third signal with N points, where N = 8 | | | | | | | |
|---|---|---|---|---|---|---|---|
| 0 | 0 | −3 + j | 0 | 0 | 0 | −3 − j | 0 |

S703: Determine the fourth signal with N/2 points and the fifth signal with N/2 points based on the second signal with N points.

Figure 8:
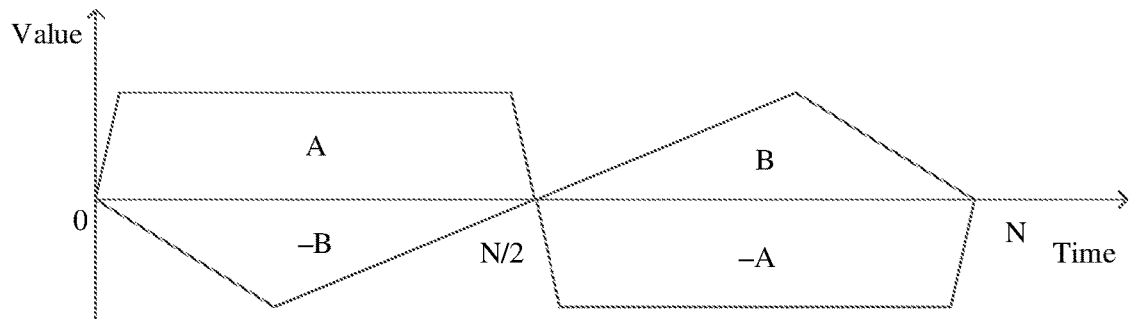
FIG. 8 is a schematic diagram of a time domain signal of an OFDM signal that is of a frequency domain signal with N points at an odd location and that meets an HS constraint according to an embodiment of this application.

In a possible implementation, the first signal with N points is a frequency domain signal of an OFDM signal, and the second signal with N points is also a frequency domain signal of an OFDM signal. In this implementation, the determining the fourth signal with N/2 points and the fifth signal with N/2 points based on the second signal with N points includes:

IFFT is performed on the second signal with N points, to generate a time domain signal with N points (which may be referred to as the thirteenth signal with N points), and the time domain signal with N points meets asymmetry. FIG. 8 is a schematic diagram of a time domain signal of an OFDM signal that is of a frequency domain signal with N points at an odd location and that meets an HS constraint according to an embodiment of this application.

Further, the fourth signal with N/2 points and the fifth signal with N/2 points are determined based on the time domain signal with N points. A time domain signal with N/2 points included in the fourth signal with N/2 points includes negative parts, that are set to 0, of a time domain signal with 0 to N/2−1 points (which may also be referred to as first N/2 points) of the time domain signal with N points and positive parts of the time domain signal with 0 to N/2−1 points of the time domain signal with N points.

Alternatively, a time domain signal with N/2 points included in the fourth signal with N/2 points includes positive parts, that are set to 0, of a time domain signal with N/2 to N−1 points (which may also be referred to as last N/2 points) of the time domain signal with N points and an absolute value of negative parts of the time domain signal with N/2 to N−1 points of the time domain signal with N points.

A time domain signal with N/2 points included in the fifth signal with N/2 points includes the positive parts, that are set to 0, of the time domain signal with 0 to N/2−1 points of the time domain signal with N points and an absolute value of the negative parts of the time domain signal with 0 to N/2−1 points of the time domain signal with N points.

Alternatively, a time domain signal with N/2 points included in the fifth signal with N/2 points includes the negative parts, that are set to 0, of the signal with N/2 to N−1 points of the time domain signal with N points and the positive parts of the time domain signal with N/2 to N−1 points of the time domain signal with N points.

In another possible implementation, the first signal with N points is a time domain signal of an OFDM signal, and the second signal with N points is also a time domain signal of an OFDM signal. In this implementation, the determining the fourth signal with N/2 points and the fifth signal with N/2 points based on the second signal with N points includes:

FFT is performed on the second signal with N points, to generate a frequency domain signal with N points (which may be referred to as the thirteenth signal with N points), and the frequency domain signal with N points meets asymmetry.

Further, a manner of determining the fourth signal with N/2 points and the fifth signal with N/2 points based on the frequency domain signal with N points is similar to the foregoing possible manner. Details are not described herein again.

The following is described by using an example in which the second signal with N points is a frequency domain signal of an OFDM signal.

After IFFT is performed on a frequency domain signal with N points at an odd location: 0, X(1), 0, X(3), . . . , 0, X(N−1), a time domain signal is obtained and meets asymmetry.

In the time domain signal with 0 to N/2−1 points in FIG. 8, a time domain signal greater than or equal to 0 is defined as A, and a time domain signal less than 0 is defined as −B, where both A and B are time domain signals greater than 0. Alternatively, in the time domain signal with N/2 to N−1 points in FIG. 8, a time domain signal less than 0 is defined as −A, and a time domain signal greater than or equal to 0 is defined as B, where both A and B are time domain signals greater than 0.

Specifically, after IFFT is performed on the frequency domain signal with N points at an odd location: 0, X(1), 0, X(3), . . . , 0, X(N−1), the time domain signal: x0(0), x0(1), . . . , x0(N−1) is obtained, and meets asymmetry. For example, x0(m)=−x0(N/2+m), and a positive signal with N/2 points and a negative signal with N/2 points whose index values are 0 to N/2−1 are extracted.

The positive signal with N/2 points is A=A(0), A(1), . . . , and A(N/2−1). When x0(m)≥0, A(m)=x0(m). When x0(m)<0, A(m)=0. An absolute value of the negative signal with N/2 points is B=B(0), B(1), . . . , and B(N/2−1). When x0(m)≥0, B(m)=0. When x0(m)<0, B(m)=−x0(m).

For another example, the x0(m)=−x0(N/2+m), and a positive signal with N/2 points and a negative signal with N/2 points whose index values are N/2 to N−1 are extracted.

The positive signal with N/2 points is B=B(N/2), B(N/2+1), . . . , and B(N−1). When x0(m)≥0, B(m)=x0(m). When x0(m)<0, B(m)=0. An absolute value of the negative signal with N/2 points is A=A(N/2), A(N/2+1), . . . , and A(N−1). When x0(m)≥0, A(m)=0. When x0(m)<0, A(m)=−x0(m).

S704: Determine the sixth signal with N/2 points and the seventh signal with N/2 points based on the third signal with N points.

Figure 9:
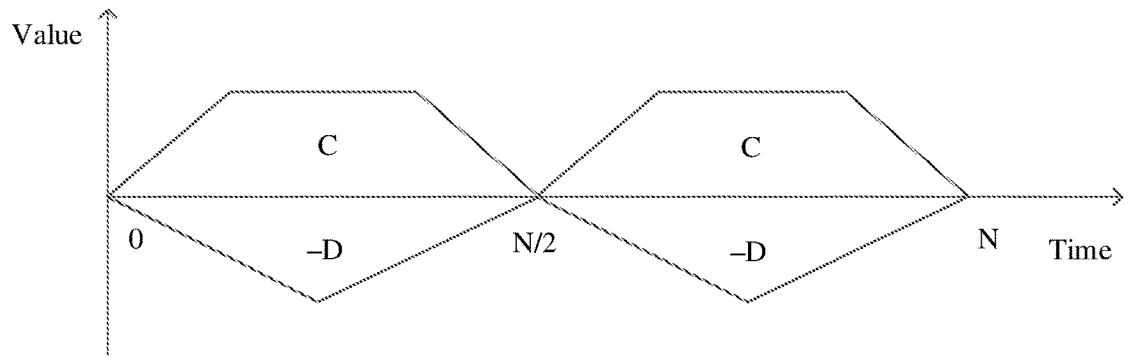
FIG. 9 is a schematic diagram of a time domain signal of an OFDM signal that is of a frequency domain signal with N points at an even location and that meets an HS constraint according to an embodiment of this application.

In a possible implementation, the first signal with N points is a frequency domain signal of an OFDM signal, and the third signal with N points is also a frequency domain signal of an OFDM signal. In this implementation, the determining the sixth signal with N/2 points and the seventh signal with N/2 points based on the third signal with N points includes:

IFFT is performed on the third signal with N points, to generate a time domain signal with N points (which may be referred to as the fourteenth signal with N points), and the time domain signal with N points meets symmetry. FIG. 9 is a schematic diagram of a time domain signal of an OFDM signal that is of a frequency domain signal with N points at an even location and that meets an HS constraint according to an embodiment of this application.

Further, the sixth signal with N/2 points and the seventh signal with N/2 points are determined based on the time domain signal with N points. A time domain signal with N/2 points included in the sixth signal with N/2 points includes negative parts, that are set to 0, of a time domain signal with 0 to N/2−1 points or N/2 to N−1 points of the time domain signal with N points and positive parts of the time domain signal with 0 to N/2−1 points or N/2 to N−1 points of the time domain signal with N points. A time domain signal with N/2 points included in the seventh signal with N/2 points or with N/2 to N−1 points includes positive parts, that are set to 0, of the time domain signal with 0 to N/2−1 points of the time domain signal with N points and an absolute value of negative parts of the time domain signal with 0 to N/2−1 points of the time domain signal with N points.

In another possible implementation, the first signal with N points is a time domain signal of an OFDM signal, and the third signal with N points is also a time domain signal of an OFDM signal. In this implementation, the determining the sixth signal with N/2 points and the seventh signal with N/2 points based on the third signal with N points includes:

FFT is performed on the third signal with N points, to generate a frequency domain signal with N points (which may be referred to as the fourteenth signal with N points), and the frequency domain signal with N points meets symmetry.

Further, a manner of determining the sixth signal with N/2 points and the seventh signal with N/2 points based on the frequency domain signal with N points is similar to the foregoing possible manner. Details are not described herein again.

The following is described by using an example in which the third signal with N points is a frequency domain signal of an OFDM signal.

After IFFT is performed on a frequency domain signal with N points at an even location: X(0), 0, X(2), 0, ..., X(N−2), 0, a time domain signal is obtained and meets symmetry.

In the time domain signal with 0 to N/2−1 points in FIG. 9, a time domain signal greater than or equal to 0 is defined as C, and a time domain signal less than 0 is defined as −D, where both C and D are frequency domain signals greater than 0. Alternatively, in the time domain signal with N/2 to N−1 points in FIG. 9, a time domain signal less than 0 is defined as −D, and a time domain signal greater than or equal to 0 is defined as C, where both C and D are frequency domain signals greater than 0.

Specifically, after IFFT is performed on the frequency domain signal with N points at an even location: X(0), 0, X(2), 0, ..., X(N−2), 0, the time domain signal: xe(0), xe(1), ..., xe(N−1) is obtained, and meets symmetry. For example, xe(m)=xe(N/2+m), and a positive signal with N/2 points and a negative signal with N/2 points whose index values are 0 to N/2−1 are extracted.

The positive signal with N/2 points is C=C(0), C(1), ..., and C(N/2−1). When xe(m)≥0, C(m)=xe(m). When xe(m)<0, C(m)=0. An absolute value of the negative signal with N/2 points is D=D(0), D(1), ..., and D(N/2−1). When xe(m)≥0, D(m)=0. When xe(m)<0, D(m)=−xe(m).

For another example, the xe(m)=xe(N/2+m), and a positive signal with N/2 points and a negative signal with N/2 points whose index values are N/2 to N−1 are extracted.

The positive signal with N/2 points is C=C(N/2), C(N/2+1), ..., and C(N−1). When xe(m)≥0, C(m)=xe(m). When xe(m)<0, C(m)=0. An absolute value of the negative signal with N/2 points is D=D(N/2), D(N/2+1), ..., and D(N−1). When xe(m)≥0, D(m)=0. When xe(m)<0, D(m)=−xe(m).

For ease of understanding, the following uses an example to describe N time domain signals generated by performing IFFT on the frequency domain signal with N points at an odd location and the frequency domain signal with N points at an even location.

For example, the frequency domain signal with N points at an odd location is shown in Table 2, and eight time domain signals generated by performing IFFT with eight points on the frequency domain signal with eight points at an odd location is shown in Table 5.

TABLE 5

Signal with N points at an odd location, and signal obtained after IFFT, where N = 8

| −1 | −0.707 | 1 | 0 | 1 | 0.707 | −1 | 0 |

The frequency domain signal with N points at an even location is shown in Table 3, and eight time domain signals generated by performing IFFT on the frequency domain signal with eight points at an even location is shown in Table 6.

TABLE 6

Signal with N points at an even location, and signal obtained after IFFT, where N = 8

| −0.75 | −0.25 | 0.75 | 0.25 | −0.75 | −0.25 | 0.75 | 0.25 |

It should be noted that there is no specific execution sequence between step S703 and step S704. Step S703 may be performed before S704, S704 may be performed before S703, or S703 and S704 may be simultaneously performed. Details are not described herein again.

S705: Determine the twelfth signal with 3N/2 points.

Specifically, the twelfth signal with 3N/2 points is determined in the following two manners:

Manner 1:

The eighth signal with N/2 points is determined based on the fourth signal with N/2 points and the sixth signal with N/2 points.

For example, a signal with N/2 points included in the eighth signal with N/2 points is obtained by summing up a signal at a location corresponding to the fourth signal with N/2 points and a signal at a location corresponding to the sixth signal with N/2 points. A corresponding location may be understood as that a signal at a first location of the eighth signal with N/2 points is obtained by summing up a signal at a first location of the fourth signal with N/2 points and a signal at a first location of the sixth signal with N/2 points, and by analogy, a signal at a $P^{th}$ location of the eighth signal with N/2 points is obtained by summing up a signal at a $P^{th}$ location of the fourth signal with N/2 points and a signal at a $P^{th}$ location of the sixth signal with N/2 points.

The ninth signal with N/2 points is determined based on the fifth signal with N/2 points and the sixth signal with N/2 points.

For example, a signal with N/2 points included in the ninth signal with N/2 points is obtained by summing up a signal at a location corresponding to the fifth signal with N/2 points and a signal at a location corresponding to the sixth signal with N/2 points. A corresponding location may be understood as that a signal at a first location of the ninth signal with N/2 points is obtained by summing up a signal at a first location of the fifth signal with N/2 points and a signal at a first location of the sixth signal with N/2 points, and by analogy, a signal at a $P^{th}$ location of the ninth signal with N/2 points is obtained by summing up a signal at a $P^{th}$ location of the fifth signal with N/2 points and a signal at a $P^{th}$ location of the sixth signal with N/2 points.

In Manner 1, the twelfth signal with 3N/2 points includes the eighth signal with N/2 points, the ninth signal with N/2 points, and the seventh signal with N/2 points.

The following is described in a case in which the fourth signal with N/2 points, the fifth signal with N/2 points, the sixth signal with N/2 points, and the seventh signal with N/2 points are time domain signals.

Specifically, a time domain signal with 3N/2 points is output by mixing time domain signals.

As shown in S703, time domain signals obtained after IFFT is performed on the second signal with N points at an odd location may be represented by the fourth signal with N/2 points and the fifth signal with N/2 points (namely, represented by A and B). As shown in S704, time domain signals obtained after IFFT is performed on the third signal with N points at an even location may be represented by the sixth signal with N/2 points and the seventh signal with N/2 points (namely, represented by C and D).

In Manner 1, (A+C) and (B+C) may be obtained by mixing time domain signals, or (A+C), (B+C), (B+D), and (A+D) may be obtained by mixing time domain signals. In Manner 1, (A+C) and (B+C) are selected as to-be-sent signals.

For ease of understanding, the following uses an example to describe how to generate a time domain signal with 3N/2 points by using N time domain signals obtained based on the second signal with N points at an odd location and N time domains obtained based on the third signal with N points at an even location in Manner 1.

For example, the N time domain signals obtained based on the third signal with N points at an odd location is shown in Table 5, and N time domain signals obtained based on the third signal with N points at an even location is shown in Table 6.

It can be seen from Table 5 and FIG. 8 that the N time domain signals obtained based on the second signal with N points at an odd location meet asymmetry. In the time domain signal with 0 to N/2−1 points in FIG. 8, a time domain signal greater than or equal to 0 is defined as A, and a time domain signal less than 0 is defined as −B. Alternatively, in the time domain signal with N/2 to N−1 points in FIG. 8, a time domain signal less than 0 is defined as −A, and a time domain signal greater than or equal to 0 is defined as B. Values of A and B may be shown in Table 7.

TABLE 7

| A | 0 | 0 | 1 | 0 |
|---|---|---|---|---|
| B | 1 | 0.707 | 0 | 0 |

It can be seen from Table 6 and FIG. 9 that the N time domain signals obtained based on the third signal with N points at an even location meet symmetry. In the time domain signal with 0 to N/2−1 points in FIG. 9, a time domain signal greater than or equal to 0 is defined as C, and a time domain signal less than 0 is defined as −D. Alternatively, in the time domain signal with N/2 to N−1 points in FIG. 9, a time domain signal less than 0 is defined as −D, and a time domain signal greater than or equal to 0 is defined as C. Values of C and D may be shown in Table 8.

TABLE 8

| C | 0 | 0 | 0.75 | 0.25 |
|---|---|---|------|------|
| D | 0.75 | 0.25 | 0 | 0 |

In Manner 1, the time domain signal with 3N/2 points generated by using the N time domain signals obtained based on the second signal with N points at an odd location and the N time domains obtained based on the third signal with N points at an even location includes three signals shown in Table 9.

TABLE 9

| A + C | 0 | 0 | 1.75 | 0.25 |
|-------|---|---|------|------|
| B + C | 1 | 0.707 | 0.75 | 0.25 |
| D | 0.75 | 0.25 | 0 | 0 |

Manner 2:

The tenth signal with N/2 points is determined based on the fourth signal with N/2 points and the seventh signal with N/2 points.

For example, a signal with N/2 points included in the tenth signal with N/2 points is obtained by summing up a signal at a location corresponding to the fourth signal with N/2 points and a signal at a location corresponding to the seventh signal with N/2 points. A corresponding location may be understood as that a signal at a first location of the tenth signal with N/2 points is obtained by summing up a signal at a first location of the fourth signal with N/2 points and a signal at a first location of the seventh signal with N/2 points, and by analogy, a signal at a $P^{th}$ location of the tenth signal with N/2 points is obtained by summing up a signal at a $P^{th}$ location of the fourth signal with N/2 points and a signal at a $P^{th}$ location of the seventh signal with N/2 points.

The eleventh signal with N/2 points is determined based on the fifth signal with N/2 points and the seventh signal with N/2 points.

For example, a signal with N/2 points included in the eleventh signal with N/2 points is obtained by summing up a signal at a location corresponding to the fifth signal with N/2 points and a signal at a location corresponding to the seventh signal with N/2 points. A corresponding location may be understood as that a signal at a first location of the eleventh signal with N/2 points is obtained by summing up a signal at a first location of the fifth signal with N/2 points and a signal at a first location of the seventh signal with N/2 points, and by analogy, a signal at a $P^{th}$ location of the eleventh signal with N/2 points is obtained by summing up a signal at a $P^{th}$ location of the fifth signal with N/2 points and a signal at a $P^{th}$ location of the seventh signal with N/2 points.

In Manner 2, the twelfth signal with 3N/2 points includes the tenth signal with N/2 points, the eleventh signal with N/2 points, and the sixth signal with N/2 points.

The following is described in a case in which the fourth signal with N/2 points, the fifth signal with N/2 points, the sixth signal with N/2 points, and the seventh signal with N/2 points are time domain signals.

Specifically, a time domain signal with 3N/2 points is output by mixing time domain signals.

As shown in S703, time domain signals obtained after IFFT is performed on the second signal with N points at an odd location may be represented by the fourth signal with N/2 points and the fifth signal with N/2 points (namely, represented by A and B). As shown in S704, time domain signals obtained after IFFT is performed on the third signal with N points at an even location may be represented by the sixth signal with N/2 points and the seventh signal with N/2 points (namely, represented by C and D).

In Manner 2, (A+D) and (B+D) may be obtained by mixing time domain signals, or (A+C), (B+C), (B+D), and (A+D) may be obtained by mixing time domain signals. In Manner 2, (A+D) and (B+D) are selected as to-be-sent signals.

For ease of understanding, the following uses an example to describe how to generate a time domain signal with 3N/2 points by using N time domain signals obtained based on the second signal with N points at an odd location and N time domains obtained based on the third signal with N points at an even location in Manner 2.

For example, the N time domain signals obtained based on the third signal with N points at an odd location is shown in Table 5, and N time domain signals obtained based on the third signal with N points at an even location is shown in Table 6.

It can be seen from Table 5 and FIG. 8 that the N time domain signals obtained based on the second signal with N points at an odd location meet asymmetry. It can be seen from the manner of obtaining values of A and B that the values of A and B are shown in Table 7.

In addition, it can be seen from Table 6 and FIG. 9 that the N time domain signals obtained based on the third signal with N points at an even location meet asymmetry. It can be seen from the manner of obtaining values of C and D that the values of C and D are shown in Table 8.

In Manner 2, the time domain signal with 3N/2 points generated by using the N time domain signals obtained based on the second signal with N points at an odd location and the N time domains obtained based on the third signal with N points at an even location includes three signals shown in Table 10.

TABLE 10

| A + D | 0.75 | 0.25 | 1 | 0 |
|---|---|---|---|---|
| B + D | 1.75 | 0.957 | 0 | 0 |
| C | 0 | 0 | 0.75 | 0.25 |

S706: The transmitter sends the twelfth signal with 3N/2 points to the receiver, and correspondingly, the receiver receives the twelfth signal with 3N/2 points sent by the transmitter.

It can be learned from S705 that the transmitter side sends the twelfth signal with 3N/2 points to the receiver in the following two manners corresponding to Manner 1 and Manner 2 shown in S705:

Manner 1:

The twelfth signal with 3N/2 points includes the eighth signal with N/2 points, the ninth signal with N/2 points, and the seventh signal with N/2 points, that is, (A+C), (B+C), and D are sent.

Manner 2:

The twelfth signal with 3N/2 points includes the tenth signal with N/2 points, the eleventh signal with N/2 points, and the sixth signal with N/2 points, that is, (A+D), (B+D), and C are sent.

In a possible implementation, the transmitter and the receiver may negotiate, by using signaling, that the sent twelfth signal with 3N/2 points includes (A+C), (B+C), and D or includes (A+D), (B+D), and C.

Alternatively, in another possible implementation, the transmitter may identify, by using identification information, the twelfth signal with 3N/2 points includes (A+C), (B+C), and D or includes (A+D), (B+D), and C. For example, identifiers corresponding to (A+C), (B+C), and D are respectively #1, #2, and #3, identifiers corresponding to (A+D), (B+D), and C are respectively #4, #5, and #6, and the twelfth signal with 3N/2 points includes three signals with N/2 points: (A+C), (B+C), and D. Therefore, the transmitter may carry identifiers #1, #2, and #3. The identifier may also be referred to as an index. A specific name and representation form of the identification information are not limited in this application, provided that the identification information can indicate whether the twelfth signal with 3N/2 points includes (A+C), (B+C), and D or includes (A+D), (B+D), and C.

Alternatively, in still another possible implementation, whether the twelfth signal with 3N/2 points includes (A+C), (B+C), and D or includes (A+D), (B+D), and C may be predefined in a protocol. For example, the protocol predefines that the twelfth signal with 3N/2 points includes (A+C), (B+C), and D. After receiving the twelfth signal with 3N/2 points, the receiver can determine that (A+C), (B+C), and D are received.

It should be understood that the implementation in which the receiver can determine whether the received twelfth signal with 3N/2 points includes (A+C), (B+C), and D or includes (A+D), (B+D), and C is merely an example, and does not constitute any limitation on the protection scope of this application. The receiver may alternatively learn, in another manner, of whether the twelfth signal with 3N/2 points includes (A+C), (B+C), and D or includes (A+D), (B+D), and C, for example, determining based on an empirical value. Details are not described in this application.

FIG. 10 is a schematic diagram of an air interface signal according to an embodiment of this application.

It can be seen from (a) in FIG. 10 that time domain signals (A+C), (B+C), and D are sent, and the time domain signals (A+C), (B+C), and D may be sent in any sequence. For example, other than sequentially sending the time domain signals (A+C), (B+C), and D in (a) in FIG. 10, the time domain signals may be sent in a sequence of (A+C), D, and (B+C), (B+C), (A+C), and D, (B+C), D, and (A+C), D, (A+C), and (B+C), or D, (B+C), and (A+C).

In addition, signals included in the time domain signals (A+C), (B+C), and D may also be sent in any sequence. For example, (A+C) includes a signal #1.1, a signal #1.2, a signal #1.3, and a signal #1.4, (B+C) includes a signal #2.1, a signal #2.2, a signal #2.3, and a signal #2.4, and D includes a signal #30.1, a signal #30.2, a signal #3.3, and a signal #3.4. When sending the signals included in (A+C), (B+C), and D, the transmitter may send, to the receiver, the signal #1.1, the signal #1.2, the signal #1.3, the signal #1.4, the signal #2.1, the signal #2.2, the signal #2.3, the signal #2.4, the signal #3.1, the signal #3.2, the signal #3.3, and the signal #3.4 in any sequence. The receiver can learn, based on received signals, of that the time domain signals (A+C), (B+C), and D are received.

When the sequence of sending the time domain signals (A+C), (B+C), and D is (A+C), (B+C), and D, there are three possible implementations.

In a possible implementation, the transmitter may sequentially send the signal #1.1, the signal #1.2, the signal #1.3, the signal #1.4, the signal #2.1, the signal #2.2, the signal #2.3, the signal #2.4, the signal #30.1, the signal #30.2, the signal #3.3, and the signal #3.4.

In another possible implementation, the transmitter may sequentially send the signal #1.1, the signal #2.1, the signal #3.1, the signal #1.2, the signal #2.2, the signal #3.2, the signal #1.3, the signal #2.3, the signal #3.3, the signal #1.4, the signal #2.4, and the signal #3.4.

In still another possible implementation, the transmitter may send, to the receive end, the signals included in (A+C), (B+C), and D in any sequence.

When sending the time domain signals (A+C), (B+C), and D in another sequence (for example, (B+C), (A+C), and D or (A+C), D, and (B+C)), the transmitter sends the signals included in (A+C), (B+C), and D in a manner similar to sending the time domain signals (A+C), (B+C), and D in a sequence of (A+C), (B+C), and D. Details are not described herein again.

It can be seen from (b) in FIG. 10 that time domain signals (A+D), (B+D), and C are sent, and the time domain signals (A+D), (B+D), and C may be sent in any sequence. For example, other than sequentially sending the time domain signals (A+D), (B+D), and C in (b) in FIG. 10, the time domain signals may be sent in a sequence of (A+D), C, and (B+D), (B+D), (A+D), and C, (B+D), C, and (A+D), C, (A+D), and (B+D), or C, (B+D), and (A+D).

In addition, signals included in the time domain signals (A+D), (B+D), and C may also be sent in any sequence. A manner of sending the signals included in (A+D), (B+D), and C is similar to the manner of sending the signals included in (A+C), (B+C), and D. Details are not described herein again.

S707: Restore the first signal with N points based on the twelfth signal with 3N/2 points.

It can be learned from S706 that the receiver restores the first signal with N points based on the received twelfth signal with 3N/2 points in the following two manners corresponding to Manner 1 and Manner 2 shown in S706:

Manner 1:

The twelfth signal with 3N/2 points received by the receiver includes (A+C), (B+C), and D.

In Manner 1, step S707 in the method procedure shown in FIG. 7A and FIG. 7B further includes S7071. S7071: Determine the fifteenth signal with N points and the seventh signal with N/2 points. Specifically, after receiving the twelfth signal with 3N/2 points, the receiver first separates the twelfth signal with 3N/2 points into the fifteenth signal with N points and the seventh signal with N/2 points. The fifteenth signal with N points includes (A+C) and (B+C), and the seventh signal with N/2 points is D.

For ease of understanding, the following uses an example to describe how to separate the twelfth signal with 3N/2 points into the fifteenth signal with N points and the seventh signal with N/2 points in Manner 1.

For example, in Manner 1, the twelfth signal with 3N/2 points received by the receiver is shown in Table 9, and the fifteenth signal with N points is shown in Table 11.

TABLE 11

| Fifteenth signal with N points, where N = 8 | | | | | | | |
|---|---|---|---|---|---|---|---|
| (A + C) | | | | (B + C) | | | |
| 0 | 0 | 1.75 | 0.25 | 1 | 0.707 | 0.75 | 0.25 |

The seventh signal with N/2 points is shown in Table 12.

TABLE 12

| Seventh signal with N/2 points, where N/2 = 4 D | | | |
|---|---|---|---|
| 0.75 | 0.25 | 0 | 0 |

Further, step S707 in the method procedure shown in FIG. 7A and FIG. 7B further includes S7072. S7072: The receiver determines the sixteenth signal with N points.

Specifically, the receiver performs FFT or IFFT on the fifteenth signal with N points obtained through separation in step S7071, to obtain the sixteenth signal with N points.

Optionally, if the twelfth signal with 3N/2 points received by the receiver is a time domain signal, the fifteenth signal with N points is also a time domain signal, that is, FFT is performed on the fifteenth signal with N points, to obtain the sixteenth signal with N points.

Optionally, if the twelfth signal with 3N/2 points received by the receiver is a frequency domain signal, the fifteenth signal with N points is also frequency domain signal, that is, IFFT is performed on the fifteenth signal with N points, to obtain the sixteenth signal with N points.

This embodiment of this application is described by using an example in which the first signal with N points input by the transmitter is a frequency domain signal and the twelfth signal with 3N/2 points output by the transmitter is a time domain signal.

Specifically, FFT is performed on the fifteenth signal with N points, to obtain the sixteenth signal with N points: $h/2 \times [\sim, X(1), \sim, X(3), \ldots, \sim, X(N-1)]$, where "$\sim$" may be understood as a useless signal, h is a constant signal introduced by a factor such as a channel. A value of the channel affecting factor h is not limited in this embodiment of this application, and may be any positive value.

In this application, the useless signal may be a signal generated at an even location after FFT or IFFT is performed on a signal (C, C), and a signal generated at an even location after FFT or IFFT is performed on a signal (A, B).

For ease of understanding, the following uses an example to describe how to obtain the sixteenth signal with N points by performing FFT or IFFT on the fifteenth signal with N points in Manner 1.

For example, in Manner 1, the fifteenth signal with N points obtained through separation by the receiver is shown in Table 11, and the sixteenth signal with N points obtained by performing FFT on the fifteenth signal with N points is shown in Table 13.

TABLE 13

| Sixteenth signal with N points, where N = 8 | | | | | | | |
|---|---|---|---|---|---|---|---|
| 4.7071 + j | −1.5 − 0.5j | −1.5 − 0.2071j | −0.5 + 1 − 5j | 2.2929 + 1j | −0.5 − 1.5j | −1.5 + 0.2071j | −1.5 + 0.5j |

It can be learned from Table 13 that a signal at an even location of the sixteenth signal with N points is a useless signal.

Step S707 in the method procedure shown in FIG. 7A and FIG. 7B further includes S7073. S7073: The receiver determines the second signal with N points.

Specifically, the receiver restores the second signal with N points by at least setting the sixteenth signal with N points at an even location to 0. After obtaining the sixteenth signal with N points, the receiver may restore the second signal with N points based on the sixteenth signal with N points, that is, restore the signal with N points at an odd location.

Optionally, the receiver performs channel compensation on h/2 (for example, h=1) of the sixteenth signal with N points. In other words, the restored second signal with N points, namely, $[0, X(1), 0, X(3), \ldots, 0, X(N-1)]$, is a signal obtained by dividing the sixteenth signal with N points by h/2, and setting the signal at an even location to 0.

Optionally, the restored second signal with N points, namely, $[0, X(1), 0, X(3), \ldots, 0, X(N-1)]$, is a signal obtained by setting the signal at an even location of the sixteenth signal with N points to 0.

It should be noted that, if channel compensation is performed on the sixteenth signal with N points in a process of restoring the second signal with N points by at least setting the signal at an even location of the sixteenth signal with N points to 0, impact caused by the channel factor on signal transmission in a signal transmission process can be eliminated, and accuracy of the restored second signal with N points is improved.

For ease of understanding, the following uses an example to describe how to restore the second signal with N points based on the sixteenth signal with N points in Manner 1.

For example, in Manner 1, the sixteenth signal with N points received by the receiver is shown in Table 13, and the restored second signal with N points based on the sixteenth signal with N points is shown in Table 14.

TABLE 14

| Second signal with N points, where N=8 | | | | | | | |
|---|---|---|---|---|---|---|---|
| 0 | −3 − j | 0 | −1 + 3j | 0 | −1 − 3j | 0 | −3 + j |

By comparing the second signal with N points shown in Table 14 with the second signal with N points shown in Table 2, it can be learned that the receiver can restore the second signal with N points based on the received twelfth signal with 3N/2 points.

In addition, the signal with N points at an even location needs to be restored. Step S707 in the method procedure shown in FIG. 7A and FIG. 7B further includes S7074. S7074: The receiver determines the thirteenth signal with N points. The receiver performs IFFT on the restored second signal with N points, to obtain the thirteenth signal with N points: x0(0), x0(1), . . . , x0(N−1). As shown in FIG. 8, the thirteenth signal with N points meets asymmetry. Details are not described herein again.

It can be learned that a time domain signal with N/2 points included in the fourth signal with N/2 points includes negative parts, that are set to 0, of a time domain signal with 0 to N/2-1 points of the thirteenth signal with N points and positive parts of the time domain signal with 0 to N/2-1 points of the thirteenth signal with N points. Alternatively, a time domain signal with N/2 points included in the fourth signal with N/2 points includes positive parts, that are set to 0, of a time domain signal with N/2 to N−1 points of the thirteenth signal with N points and an absolute value of negative parts of the time domain signal with N/2 to N−1 points of the thirteenth signal with N points.

A time domain signal with N/2 points included in the fifth signal with N/2 points includes the positive parts, that are set to 0, of the time domain signal with 0 to N/2−1 points of the thirteenth signal with N points and an absolute value of the negative parts of the time domain signal with 0 to N/2−1 points of the thirteenth signal with N points. Alternatively, a time domain signal with N/2 points included in the fifth signal with N/2 points includes the negative parts, that are set to 0, of the time domain signal with N/2 to N−1 points of the thirteenth signal with N points and the positive parts of the time domain signal with N/2 to N−1 points of the thirteenth signal with N points.

Then, the fourth signal with N/2 points and/or the fifth signal with N/2 points may be determined based on the thirteenth signal with N points. Step S707 in the method procedure shown in FIG. 7A and FIG. 7B further includes S7075. S7075: The receiver determines the fourth signal with N/2 points and/or the fifth signal with N/2 points.

The foregoing describes in detail the fourth signal with N/2 points and the fifth signal with N/2 points (for example, the fourth signal with N/2 points may be represented by A, and the fifth signal with N/2 points may be represented by B). Details are not described herein again.

After determining the fourth signal with N/2 points and/or the fifth signal with N/2 points in Manner 1, the receiver may determine, based on the fourth signal with N/2 points and/or the fifth signal with N/2 points and the fifteenth signal with N points, the sixth signal with N/2 points that is not received. In other words, step S707 in the method procedure shown in FIG. 7A and FIG. 7B further includes S7076. S7076: The receiver determines the sixth signal with N/2 points.

In a possible implementation, the receiver determines the fourth signal with N/2 points (that is, determining A), and the fifteenth signal with N points includes (A+C) and (B+C). Then, the receiver may obtain the sixth signal C with N/2 points based on (A+C) in the fifteenth signal with N points and the determined A.

For example, C=(A+C)−A.

In another possible implementation, the receiver determines the fifth signal with N/2 points (that is, determining B), and the fifteenth signal with N points includes (A+C) and (B+C). Then, the receiver may obtain the sixth signal C with N/2 points based on (B+C) in the fifteenth signal with N points and the determined B.

For example, C=(B+C)−B.

In still another possible implementation, the receiver determines the fourth signal with N/2 points and the fifth signal with N/2 points (that is, determining A and B), and the fifteenth signal with N points includes (A+C) and (B+C). Then, the receiver may obtain the sixth signal C with N/2 points based on (A+C) and (B+C) in the fifteenth signal with N points and the determined A and B.

For example, C=[(A+C)+(B+C)−A−B]/2.

After obtaining the sixth signal with N/2 points, the receiver may determine the fourteenth signal with N points based on the sixth signal with N/2 points and the received seventh signal with N/2 points. In other words, step S707 in the method procedure shown in FIG. 7A and FIG. 7B further includes S7077. S7077: The receiver determines the fourteenth signal with N points. For example, a signal with first N/2 points of the fourteenth signal with N points or a signal with last N/2 points of the fourteenth signal with N points is a difference between the sixth signal with N/2 points and the seventh signal with N/2 points.

For example, the sixth signal with N/2 points is shown in a first row in Table 8, and the seventh signal with N/2 points is shown in a second row in Table 8. In this case, the fourteenth signal with N points is shown in Table 15-1.

TABLE 15-1

| (C-D) | | | | (C-D) | | | |
|---|---|---|---|---|---|---|---|
| −0.75 | −0.25 | 0 − 75 | 0.25 | −0.75 | −0.25 | 0.75 | 0.25 |

For example, the signal with first N/2 points of the fourteenth signal with N points is a difference between the sixth signal with N/2 points and the seventh signal with N/2 points, and the signal with last N/2 points of the fourteenth signal with N points is 0.

For example, the sixth signal with N/2 points is shown in a first row in Table 8, and the seventh signal with N/2 points is shown in a second row in Table 8. In this case, the fourteenth signal with N points is shown in Table 15-2.

TABLE 15-2

| (C-D) | | | | | | | |
|---|---|---|---|---|---|---|---|
| −0.75 | −0.25 | 0-75 | 0.25 | 0 | 0 | 0 | 0 |

For example, the signal with last N/2 points of the fourteenth signal with N points is a difference between the sixth signal with N/2 points and the seventh signal with N/2 points, and the signal with first N/2 points of the fourteenth signal with N points is 0.

For example, the sixth signal with N/2 points is shown in a first row in Table 8, and the seventh signal with N/2 points is shown in a second row in Table 8. In this case, the fourteenth signal with N points is shown in Table 15-3.

TABLE 15-3

| 0 | | | | (C-D) | | | |
|---|---|---|---|---|---|---|---|
| 0 | 0 | 0 | 0 | −0.75 | −0.25 | 0.75 | 0.25 |

The receiver performs FFT on the fourteenth signal with N points, to obtain the third signal with N points. In other words, step S707 in the method procedure shown in FIG. 7A and FIG. 7B further includes S7078. S7078: The receiver determines the third signal with N points.

For example, the receiver performs FFT on the fourteenth signal with N points shown in Table 15-1, to obtain the third signal with N points shown in Table 16-1.

TABLE 16-1

| Third signal with N points, where N = 8 | | | | | | | |
|---|---|---|---|---|---|---|---|
| 0 | 0 | −3 + j | 0 | 0 | 0 | −3 − j | 0 |

For another example, the receiver performs FFT on the fourteenth signal with N points shown in Table 15-2 or Table 15-3, to obtain the signal with N points shown in Table 16-2.

TABLE 16-2

| Third signal with N points, where N = 8 | | | | | | | |
|---|---|---|---|---|---|---|---|
| 0 | 0 | (−3 + j)/2 | 0 | 0 | 0 | (−3 − j)/2 | 0 |

Then, values in Table 16-2 are multiplied by 2, to obtain the third signal with N points shown in Table 16-3.

TABLE 16-3

| Third signal with N points, where N = 8 | | | | | | | |
|---|---|---|---|---|---|---|---|
| 0 | 0 | −3 + j | 0 | 0 | 0 | −3 − j | 0 |

By comparing the third signal with N points shown in Table 16-1 or Table 16-3 with the third signal with N points shown in Table 3, it can be learned that the receiver can restore the third signal with N points based on the received twelfth signal with 3N/2 points.

The first signal with N points is restored based on the known second signal with N points at an odd location and the third signal with N points at an even location.

For example, the second signal with N points at an odd location and the third signal with N points at an even location are respectively shown in Table 14 and Table 16, and the restored first signal with N points is shown in Table 17.

TABLE 17

| First signal with N points, where N = 8 | | | | | | | |
|---|---|---|---|---|---|---|---|
| 0 | −3 − j | −3 + j | −1 + 3j | 0 | −1 − 3j | −3 − j | −3 + j |

By comparing the first signal with N points shown in Table 17 with the first signal with N points shown in Table 1, it can be learned that the receiver can restore the first signal with N points based on the received twelfth signal with 3N/2 points.

Manner 2:

The twelfth signal with 3N/2 points received by the receiver includes (A+D), (B+D), and C.

In Manner 2, step S707 in the method procedure shown in FIG. 7A and FIG. 7B further includes S7079. S7079: The receiver determines the seventeenth signal with N points and the sixth signal with N/2 points. Specifically, after receiving the twelfth signal with 3N/2 points, the receiver first separates the twelfth signal with 3N/2 points into the seventeenth signal with N points and the sixth signal with N/2 points. The seventeenth signal with N points includes (A+D) and (B+D), and the sixth signal with N/2 points is C.

For ease of understanding, the following uses an example to describe how to separate the twelfth signal with 3N/2 points into the seventeenth signal with N points and the sixth signal with N/2 points in Manner 2.

For example, in Manner 2, the twelfth signal with 3N/2 points received by the receiver is shown in Table 10, and the seventeenth signal with N points is shown in Table 18.

TABLE 18

| Seventeenth signal with N points, where N = 8 | | | | | | | |
|---|---|---|---|---|---|---|---|
| (A + D) | | | | (B + D) | | | |
| 0.75 | 0.25 | 1 | 0 | 1.75 | 0.957 | 0 | 0 |

The sixth signal with N/2 points is shown in Table 19.

TABLE 19

| Sixth signal with N/2 points, where N/2 = 4 | | | |
|---|---|---|---|
| C | | | |
| 0 | 0 | 0.75 | 0.25 |

Further, step S707 in the method procedure shown in FIG. 7A and FIG. 7B further includes S70710. S70710: The receiver determines the eighteenth signal with N points. Specifically, the receiver performs FFT or IFFT on the seventeenth signal with N points obtained through separation in step S70710, to obtain the eighteenth signal with N points. This is similar to obtaining the sixteenth with N points by performing FFT or IFFT on the fifteenth signal with N points obtained through separation in Manner, except that the fifteenth signal with N points includes (A+C) and (B+C) in Manner 1, and the fifteenth signal with N points includes (A+D) and (B+D) in Manner 2. Details are not described herein again.

A procedure of Manner 2 is similar to a procedure of Manner 1. After obtaining the eighteenth signal with N points, the receiver restores the second signal with N points based on the eighteenth signal with N points, that is, restore the signal with N points at an odd location. In other words, step S707 in the method procedure shown in FIG. 7A and FIG. 7B further includes S70711. S70711: The receiver determines the second signal with N points.

Specifically, the receiver restores the second signal with N points by at least setting the eighteenth signal with N points at an even location to 0. A specific manner of determining the second signal with N points is similar to that in Manner 1. Details are not described herein again.

In addition, the signal with N points at an even location needs to be restored. Step S707 in the method procedure shown in FIG. 7A and FIG. 7B further includes S70712. S70712: The receiver determines the thirteenth signal with N points. The receiver performs IFFT on the restored second signal with N points, to obtain the thirteenth signal with N points: x0(0), x0(1), . . . , x0(N−1). As shown in FIG. 8, the thirteenth signal with N points meets asymmetry. Details are not described herein again.

It can be learned that a time domain signal with N/2 points included in the fourth signal with N/2 points includes negative parts, that are set to 0, of a time domain signal with 0 to N/2−1 points of the thirteenth signal with N points and positive parts of the time domain signal with 0 to N/2−1 points of the thirteenth signal with N points. Alternatively, a time domain signal with N/2 points included in the fourth signal with N/2 points includes positive parts, that are set to 0, of a time domain signal with N/2 to N−1 points of the thirteenth signal with N points and an absolute value of negative parts of the time domain signal with N/2 to N−1 points of the thirteenth signal with N points.

A time domain signal with N/2 points included in the fifth signal with N/2 points includes the positive parts, that are set to 0, of the time domain signal with 0 to N/2−1 points of the thirteenth signal with N points and an absolute value of the negative parts of the time domain signal with 0 to N/2−1 points of the thirteenth signal with N points. Alternatively, a time domain signal with N/2 points included in the fifth signal with N/2 points includes the negative parts, that are set to 0, of the time domain signal with N/2 to N−1 points of the thirteenth signal with N points and the positive parts of the time domain signal with N/2 to N−1 points of the thirteenth signal with N points.

Then, the fourth signal with N/2 points and/or the fifth signal with N/2 points may be determined based on the thirteenth signal with N points. Step S707 in the method procedure shown in FIG. 7A and FIG. 7B further includes S70713. S70713: The receiver determines the fourth signal with N/2 points and/or the fifth signal with N/2 points.

The foregoing describes in detail the fourth signal with N/2 points and the fifth signal with N/2 points (for example, the fourth signal with N/2 points may be represented by A, and the fifth signal with N/2 points may be represented by B). Details are not described herein again.

After determining the fourth signal with N/2 points and/or the fifth signal with N/2 points in Manner 2, the receiver may determine, based on the fourth signal with N/2 points and/or the fifth signal with N/2 points, and the seventeenth signal with N points, the seventh signal with N/2 points that is not received. In other words, step S707 in the method procedure shown in FIG. 7A and FIG. 7B further includes S70714. S70714: The receiver determines the seventh signal with N/2 points. In a possible implementation, the receiver determines the fourth signal with N/2 points (that is, determining A), and the seventeenth signal with N points includes (A+D) and (B+D). Then, the receiver may obtain the seventh signal D with N/2 points based on (A+D) in the seventeenth signal with N points and the determined A.

For example, D=(A+D)−A.

In a possible implementation, the receiver determines the fifth signal with N/2 points (that is, determining B), and the seventeenth signal with N points includes (A+D) and (B+D). Then, the receiver may obtain the seventh signal D with N/2 points based on (B+D) in the seventeenth signal with N points and the determined B.

For example, D=(B+D)−B.

In still another possible implementation, the receiver determines the fourth signal with N/2 points and the fifth signal with N/2 points (that is, determining A and B), and the seventeenth signal with N points includes (A+D) and (B+D). Then, the receiver may obtain the seventh signal D with N/2 points based on (A+D) and (B+D) in the seventeenth signal with N points and the determined A and B.

For example, D=[(A+D)+(B+D)−A−B]/2.

After obtaining the seventh signal with N/2 points, the receiver may determine the fourteenth signal with N points based on the received sixth signal with N/2 points and the seventh signal with N/2 points. In other words, step S707 in the method procedure shown in FIG. 7A and FIG. 7B further includes S70715. S70715: The receiver determines the fourteenth signal with N points.

For example, a signal with first N/2 points of the fourteenth signal with N points or a signal with last N/2 points of the fourteenth signal with N points is a difference between the sixth signal with N/2 points and the seventh signal with N/2 points.

For example, the signal with first N/2 points of the fourteenth signal with N points is a difference between the sixth signal with N/2 points and the seventh signal with N/2 points, and the signal with last N/2 points of the fourteenth signal with N points is 0.

For example, the signal with last N/2 points of the fourteenth signal with N points is a difference between the sixth signal with N/2 points and the seventh signal with N/2 points, and the signal with first N/2 points of the fourteenth signal with N points is 0.

A manner of determining the fourteenth signal with N points is same as that in Manner 2. Details are not described herein again.

Further, step S707 in the method procedure shown in FIG. 7A and FIG. 7B further includes S70716. S70716: The receiver determines the third signal with N points.

Specifically, the receiver performs FFT based on fourteenth signal with N points, to restore the third signal with N points, and obtains the first signal with N points based on the second signal with N points and the third signal with N points in a manner same as that in Manner 1. Details are not described herein again.

It can be learned from the method procedure shown in FIG. 7A and FIG. 7B that the receiver may restore the input signal with N points of the transmitter based on the input signal with 3N/2 points. Therefore, spectral efficiency of the signal transmission method provided in embodiments of this application is ⅔ while meeting an HS constraint. In addition, because there is no direct current bias, power consumption is not increased. Compared with the solution ensuring that a baseband signal of an OFDM signal is a non-negative real number at the expense of spectral efficiency and/or power consumption, the signal transmission method provided in embodiments of this application improves spectral efficiency without increasing power consumption while ensuring that a baseband signal of an OFDM signal is a non-negative real number.

In addition, in the signal transmission method provided in embodiments of this application, when demodulating a signal, the receiver performs few addition and subtraction operations on an input signal, to reduce a signal-to-noise ratio. Because noise is superimposed when addition and subtraction operations are performed on the input signal, the signal transmission method provided in embodiments of this application has a high noise tolerance.

In the method embodiments, the sequence numbers of the foregoing processes do not mean execution sequences. The execution sequences of the processes should be determined based on functions and internal logic of the processes, and should not be construed as any limitation on the implementation processes of embodiments of this application. In addition, not all operations in the method embodiments need to be performed.

It should be understood that the transmitter and the receiver in the method embodiments may perform a part or all of the steps in the embodiments. These steps or operations are merely examples. Embodiments of this application may further include performing other operations or variations of various operations.

It should further be understood that, in embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It should be noted that embodiments of this application are mainly described by using an example in which the transmitter side separates the to-be-sent first signal with N points into the second signal with N points at an odd location and the third signal with N points at an even location. However, a manner of separating the first signal with N points is not limited in this application. The first signal with N points may alternatively be divided into M groups of signals, provided that a signal obtained after IFFT or FFT is performed on each of the M groups of signals meets symmetry or asymmetry.

For example, the first signal with N points is divided into three groups of signals:

Group 1: 0, X(1), 0, X(3), 0, X(5), . . .
Group 2: X(0), 0, 0, 0, X(4), 0, 0, 0, . . .
Group 3: 0, 0, X(2), 0, 0, 0, X(6), 0, 0, 0, X(10), . . .

The signals in Group 1 meet an asymmetric structure after IFFT or FFT is performed, and the signals in Group 2 and Group 3 meet a symmetric structure after IFFT or FFT is performed.

For another example, the first signal with N points is divided into four groups of signals:

Group 1: 0, X(1), 0, 0, 0, X(5), . . .
Group 2: 0, 0, 0, X(3), 0, 0, 0, X(7), . . .
Group 3: X(0), 0, 0, 0, X(4), 0, 0, 0, . . .
Group 4: 0, 0, X(2), 0, 0, 0, X(6), 0, 0, 0, X(10), . . .

The signals in Group 1 and Group 2 meet an asymmetric structure after IFFT or FFT is performed, and the signals in Group 3 and Group 4 meet a symmetric structure after IFFT or FFT is performed.

After the signals that meet symmetry or asymmetry are obtained, similarly, the obtained signals are combined and sent, and then the receiver demodulates the signals. For a specific combination manner and a demodulation manner of the receiver side, refer to descriptions in the foregoing embodiments.

For example, when the first signal with N points is divided into the four groups of signals, for Group 1 and Group 3, the transmitter side may combine and send the two groups of signals in the manner of processing the second signal with N points and the third signal with N points in embodiments of this application, and the receiver side may perform demodulation in the manner of processing the twelfth signal with 3N/2 points in embodiments of this application. Similarly, for Group 2 and Group 4, the transmitter side may combine and send the two groups of signals in the manner of processing the second signal with N points and the third signal with N points in embodiments of this application, and the receiver side may perform demodulation in the manner of processing the twelfth signal with 3N/2 points in embodiments of this application.

It should be noted that combining, sending, and demodulating the plurality of groups of signals is merely an example, and does not constitute any limitation on the protection scope of this application. After more than two groups of signals that meet an asymmetric structure or a symmetric structure through IFFT or FFT are obtained, the more than two groups of signals may be combined, sent, and demodulated in another manner. Details are not described herein again.

The foregoing describes in detail the signal transmission method provided in embodiments of this application with reference to FIG. 7A and FIG. 7B to FIG. 10. The following describes in detail a signal transmission apparatus provided in embodiments of this application with reference to FIG. 11 to FIG. 14.

FIG. 11 is a schematic diagram of a signal transmission apparatus 1100 according to this application. As shown in FIG. 11, the apparatus 1100 includes an obtaining unit 1110, a processing unit 1120, and a sending unit 1130.

The signal transmission apparatus 1100 may be configured to implement a function of the transmitter in any one of the method embodiments. For example, the signal transmission apparatus 1100 may be a transmitter.

The signal transmission apparatus 1100 may be used as a transmitter, and perform steps performed by the transmitter in the method embodiments. The obtaining unit 1110 and/or the sending unit 1130 may be configured to support the signal transmission apparatus 1100 in performing communication, for example, performing sending and/or receiving performed by the transmitter in FIG. 7A and FIG. 7B. The processing unit 1120 may be configured to support the signal transmission apparatus 1100 in performing processing in the method embodiments, for example, performing processing performed by the transmitter in FIG. 7A and FIG. 7B.

Optionally, the signal transmission apparatus 1100 may further include a storage unit 1140 (not shown in FIG. 11), configured to store program code and data of the signal transmission apparatus 1100.

Specifically, refer to the following descriptions:

The obtaining unit 1110 is configured to obtain a first signal with N points.

The processing unit 1120 is configured to determine a second signal with N points and a third signal with N points based on the first signal with N points. The second signal with N points is used to determine a fourth signal with N/2 points and a fifth signal with N/2 points, and the third signal with N points is used to determine a sixth signal with N/2 points and a seventh signal with N/2 points.

The processing unit 1120 is further configured to: determine an eighth signal with N/2 points based on the fourth signal with N/2 points and the sixth signal with N/2 points, and determine a ninth signal with N/2 points based on the fifth signal with N/2 points and the sixth signal with N/2 points.

Alternatively, the processing unit 1120 is further configured to: determine a tenth signal with N/2 points based on the fourth signal with N/2 points and the seventh signal with N/2 points, and determine an eleventh signal with N/2 points based on the fifth signal with N/2 points and the seventh signal with N/2 points.

The sending unit 1130 is configured to send a twelfth signal with 3N/2 points. The twelfth signal with 3N/2 points includes the eighth signal with N/2 points, the ninth signal with N/2 points, and the seventh signal with N/2 points, or the twelfth signal with 3N/2 points includes the tenth signal with N/2 points, the eleventh signal with N/2 points, and the sixth signal with N/2 points.

The second signal with N points is obtained by setting a signal at an even location in the first signal with N points to 0, and the third signal with N points is obtained by setting a signal at an odd location in the first signal with N points to 0.

The apparatus 1100 corresponds to the transmitter in the method embodiments. The apparatus 1100 may be the transmitter in the method embodiments, or a chip or a functional module inside the transmitter in the method embodiments. Corresponding units of the apparatus 1100 are configured to perform corresponding steps performed by the transmitter in the method embodiment shown in FIG. 7A and FIG. 7B.

The obtaining unit 1110 in the apparatus 1100 performs steps of obtaining performed by the transmitter in the method embodiments, for example, performing step S701 of obtaining the first signal with N points by the access network device in FIG. 7A and FIG. 7B.

The sending unit 1130 in the apparatus 1100 is configured to implement a function of sending a message to another device, for example, performing step S706 of sending the twelfth signal with 3N/2 points to the receiver in FIG. 7A and FIG. 7B.

The processing unit 1120 in the apparatus 1100 performs steps implemented or processed inside the transmitter in the method embodiments, for example, performing step S702 of determining the second signal with N points and the third signal with N points, step S703 of determining the fourth signal with N/2 points and the fifth signal with N/2 points, step S704 of determining the sixth signal with N/2 points and the seventh signal with N/2 points, and step S705 of determining the twelfth signal with 3N/2 points in FIG. 7A and FIG. 7B.

The obtaining unit 1110 and the sending unit 1130 may form a transceiver unit that has both receiving and sending functions. The processing unit 1120 may be a processor. The sending unit 1130 may be a transmitter. The obtaining unit 1110 may be a receiver. The receiver and the transmitter may be integrated to form a transceiver.

FIG. 12 is a schematic diagram of a structure of a transmitter 1200 applicable to an embodiment of this application. The transmitter 1200 may be applied to the system shown in FIG. 1. For ease of description, FIG. 12 shows only main components of the transmitter 1200. As shown in FIG. 12, the transmitter 1200 includes a processor 1210, a memory 1220, and a transceiver 1230. The processor 1210 is configured to control the transceiver 1230 to receive and send a signal. The memory 1220 is configured to store a computer program. The processor 1210 is configured to invoke the computer program from the memory 1220 and run the computer program, to perform a corresponding procedure and/or operation performed by user equipment in the signal transmission method provided in this application. Details are not described herein again.

A person skilled in the art may understand that, for ease of description, FIG. 12 shows only one memory and one processor. In an actual transmitter, there may be a plurality of processors and a plurality of memories. The memory may also be referred to as a storage medium, a storage device, or the like. This is not limited in this embodiment of this application.

FIG. 13 is a schematic diagram of a signal transmission apparatus 1300 according to this application. As shown in FIG. 13, the apparatus 1300 includes a receiving unit 1310 and a processing unit 1320.

The signal transmission apparatus 1300 may be configured to implement a function of the receiver in any one of the method embodiments. For example, the signal transmission apparatus 1300 may be a receiver.

The signal transmission apparatus 1300 may be used as a receiver, and perform steps performed by the receiver in the method embodiments. The receiving unit 1310 and/or a sending unit may be configured to support the signal transmission apparatus 1300 in performing communication, for example, performing sending and/or receiving performed by the receiver in FIG. 7A and FIG. 7B.

Optionally, the signal transmission apparatus 1300 may further include the sending unit 1330 (not shown in FIG. 13), configured to support the signal transmission apparatus 1300 in performing sending in the method embodiments, for example, performing sending performed by the receiver in FIG. 7A and FIG. 7B.

Optionally, the signal transmission apparatus 1300 may further include a storage unit 1340 (not shown in FIG. 13), configured to store program code and data of the signal transmission apparatus 1300.

Specifically, refer to the following descriptions:

The receiving unit 1310 is configured to obtain a twelfth signal with 3N/2 points.

The twelfth signal with 3N/2 points includes an eighth signal with N/2 points, a ninth signal with N/2 points, and a seventh signal with N/2 points; or
 the twelfth signal with 3N/2 points includes a tenth signal with N/2 points, an eleventh signal with N/2 points, and a sixth signal with N/2 points.

The processing unit 1320 is configured to separate the twelfth signal with 3N/2 points, to obtain a signal with N/2 points and a signal with N points.

The processing unit 1320 is further configured to determine a second signal with N points based on the signal with N points.

The processing unit 1320 is further configured to determine a third signal with N points based on the second signal with N points and the signal with N/2 points.

The processing unit 1320 is further configured to determine a first signal with N points based on the second signal with N points and the third signal with N points.

N is a positive even number. The apparatus 1300 corresponds to the receiver in the method embodiments. The apparatus 1300 may be the receiver in the method embodiments, or a chip or a functional module inside the receiver in the method embodiments. Corresponding units of the apparatus 1300 are configured to perform corresponding steps performed by the receiver in the method embodiment shown in FIG. 7A and FIG. 7B.

The receiving unit 1310 in the apparatus 1300 performs the step in which the receiver receives a message sent by another device in the method embodiments, for example, performing step S701 of receiving the twelfth signal with 3N/2 points sent by the transmitter in FIG. 7A and FIG. 7B.

The processing unit 1320 in the apparatus 1300 performs steps implemented or processed inside the receiver in the method embodiments, for example, performing step S707 of restoring the first signal with N points in FIG. 7A and FIG. 7B.

The signal transmission apparatus shown in the apparatus 1300 may further include the sending unit (not shown in FIG. 13), and the sending unit performs the step of sending performed by the receiver in the method embodiments.

The receiving unit 1310 and the sending unit may form a transceiver unit that has both receiving and sending functions. The processing unit 1320 may be a processor. The receiving unit 1310 may be a receiver. The sending unit may be a transmitter. The receiver and the transmitter may be integrated to form a transceiver.

As shown in FIG. 14, an embodiment of this application further provides a receiver 1400. The receiver 1400 includes a processor 1410, a memory 1420, and a transceiver 1430. The memory 1420 stores instructions or a program, and the processor 1410 is configured to execute the instructions or the program stored in the memory 1420. When the instructions or the program stored in the memory 1420 is executed, the transceiver 1430 is configured to perform operations performed by the receiving unit 1310 in the apparatus 1300 shown in FIG. 13.

This application further provides a computer-readable storage medium. The computer-readable storage medium stores a computer program or instructions. When the computer program or the instructions is/are run on a computer, steps performed by the transmitter in the method shown in FIG. 7A and FIG. 7B are performed.

This application further provides a computer-readable storage medium. The computer-readable storage medium stores a computer program or instructions. When the computer program or the instructions is/are run on a computer, steps performed by the receiver in the method shown in FIG. 7A and FIG. 7B are performed.

This application further provides a computer program product including instructions. When the computer program product runs on a computer, steps performed by the transmitter in the method shown in FIG. 7A and FIG. 7B are performed.

This application further provides a computer program product including instructions. When the computer program product runs on a computer, steps performed by the receiver in the method shown in FIG. 7A and FIG. 7B are performed.

This application further provides a chip including a processor. The processor is configured to read and run a computer program stored in a memory, to perform a corresponding operation and/or procedure performed by the transmitter in the service guarantee method provided in this application. Optionally, the chip further includes the memory. The memory is connected to the processor by using a circuit or a wire. The processor is configured to read and execute the computer program stored in the memory. Further, optionally, the chip system further includes a communication interface, and the processor is connected to the communication interface. The communication interface is configured to receive data and/or information that needs to be processed. The processor obtains the data and/or the information from the communication interface, and processes the data and/or the information. The communication interface may be an input/output interface.

This application provides an apparatus configured to perform the method performed by the transmitter or the receiver. The apparatus includes at least one input interface (Input(s)), a logic circuit, and at least one output interface (Output(s)). Optionally, the logic circuit may be a chip or another integrated circuit that can implement the method in this application.

The input interface is configured to input or receive data. The output interface is configured to output or send data. The logic circuit is configured to perform the possible methods.

For example, when the apparatus is a transmitter, the input interface may be configured to obtain the first signal with N points. The output interface may be configured to output the twelfth signal with 3N/2 points. The logic circuit is configured to obtain the twelfth signal with 3N/2 points in various possible manners in the embodiments.

For example, when the apparatus is a transmitter, the input interface may be configured to obtain the twelfth signal with 3N/2 points. The logic circuit is configured to obtain the first signal with N points in various possible manners in the embodiments.

This application further provides a chip including a processor. The processor is configured to read and run a computer program stored in a memory, to perform a corresponding operation and/or procedure performed by the receiver in the service guarantee method provided in this application. Optionally, the chip further includes the memory. The memory is connected to the processor by using a circuit or a wire. The processor is configured to read and execute the computer program stored in the memory. Further, optionally, the chip system further includes a communication interface, and the processor is connected to the communication interface. The communication interface is configured to receive data and/or information that needs to be processed. The processor obtains the data and/or the information from the communication interface, and processes the data and/or the information. The communication interface may be an input/output interface.

It should be noted that the processor in this application may be a central processing unit (CPU), an application-specific integrated circuit (ASIC), or one or more integrated circuits configured to implement embodiments of this application, for example, one or more digital signal processors (DSP) or one or more field programmable gate arrays (FPGA).

A person of ordinary skill in the art may be aware that, with reference to the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It should be understood that the chip may alternatively be replaced with a chip system. Details are not described herein again. In this application, the terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

A person of ordinary skill in the art may be aware that, with reference to the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In addition, the term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a first frequency domain signal with N points of an orthogonal frequency division multiplexing (OFDM) signal from a transmitting communication apparatus to a receiving communication apparatus and for ensuring that a baseband signal of the OFDM signal is a non-negative real number, the method comprising:

obtaining, by the transmitting communication apparatus, a first signal with N points, wherein N is a positive even integer, the first signal with N points comprising N values corresponding to the N points respectively, and the N values being indexed with i=0, . . . , N−1;

separating, by the transmitting communication apparatus, the first signal with N points, to obtain two groups of signals, wherein the two groups of signals meet symmetry or antisymmetry after fast fourier transform (FFT) or inverse FFT (IFFT), and separating the first signal with N points comprises:

determining, by the transmitting communication apparatus, a second signal with N points and a third signal with N points based on the first signal with N points, wherein the second signal with N points is generated by setting each value of the first signal with an even index to 0, and the third signal with N points is generated by setting each value of the first signal with an odd index to 0; and generating, by the transmitting communication apparatus, an eighth signal with N/2 points based on a fourth signal with N/2 points and a sixth signal with N/2 points, and generating, by the transmitting communication apparatus, a ninth signal with N/2 points based on a fifth signal with N/2 points and the sixth signal with N/2 points, wherein the fourth signal with N/2 points and the fifth signal with N/2 points are determined based on the second signal with N points, and the sixth signal with N/2 points and a seventh signal with N/2 points are determined based on the third signal with N points; or generating, by the transmitting communication apparatus, a tenth signal with N/2 points based on the fourth signal with N/2 points and the seventh signal with N/2 points, and generating, by the transmitting communication apparatus, an eleventh signal with N/2 points based on the fifth signal with N/2 points and the seventh signal with N/2 points;

combining, by the transmitting communication apparatus, the two groups of signals obtained through separation, to obtain a to-be-sent signal with 3N/2 points; and sending, by the transmitting communication apparatus, the to-be-sent signal with 3N/2 points, to enable the receiver to restore the first signal with N points from the transmitted signal with 3N/2 points, wherein sending the signal with 3N/2 points comprises:

sending, by the transmitting communication apparatus, a twelfth signal with 3N/2 points, wherein the twelfth signal with 3N/2 points comprises the eighth signal with N/2 points, the ninth signal with N/2 points and the seventh signal with N/2 points, or the twelfth signal with 3N/2 points comprises the tenth signal with N/2 points, the eleventh signal with N/2 points and the sixth signal with N/2 points.

2. The method according to claim 1, wherein the method further comprises:

performing, by the transmitting communication apparatus, IFFT or FFT on the second signal with N points, to obtain a thirteenth signal with N points, wherein the fourth signal with N/2 points is generated by including positive values of first N/2 points of the thirteenth signal and setting negative values of the first N/2 points of the thirteenth signal with N points to 0, or by setting positive values of last N/2 points of the thirteenth signal with N points to 0 and calculating absolute values of negative values of the last N/2 points of the thirteenth signal with N points; and the fifth signal with N/2 points is generated by setting the positive values of the first N/2 points of the thirteenth signal with N points to 0 and calculating absolute values of the negative values of the first N/2 points of the thirteenth signal with N points, or by including the positive values of the last N/2 points of the thirteenth signal and setting the negative values of the last N/2 points of the thirteenth signal with N points to 0.

3. The method according to claim 1, wherein the method further comprises:
performing, by the transmitting_communication apparatus, IFFT or FFT on the third signal with N points, to obtain a fourteenth signal with N points, wherein
the sixth signal with N/2 points is generated by setting negative values of first N/2 points or last N/2 points of the fourteenth signal with N points to 0; and
the seventh signal with N/2 points is generated by setting positive values of the first N/2 points or the last N/2 points of the fourteenth signal with N points to 0 and calculating absolute values of the negative values of the first N/2 points or the last N/2 points of the fourteenth signal with N points.

4. The method according to claim 1, wherein
generating the eighth signal with N/2 points based on the fourth signal with N/2 points and the sixth signal with N/2 points comprises:
summing up, by the transmitting communication apparatus, values of the fourth signal with N/2 points and values of the sixth signal with N/2 points according to their corresponding indexes, to obtain a signal with N/2 points comprised in the eighth signal with N/2 points;
generating the ninth signal with N/2 points based on the fifth signal with N/2 points and the sixth signal with N/2 points comprises:
summing up, by the transmitting_communication apparatus, values of the fifth signal with N/2 points and values of the sixth signal with N/2 points according to their corresponding indexes, to obtain a signal with N/2 points comprised in the ninth signal with N/2 points;
generating the tenth signal with N/2 points based on the fourth signal with N/2 points and the seventh signal with N/2 points comprises:
summing up, by the transmitting_communication apparatus, values of the fourth signal with N/2 points and values of the seventh signal with N/2 points according to their corresponding indexes, to obtain a signal with N/2 points comprised in the tenth signal with N/2 points; and
generating the eleventh signal with N/2 points based on the fifth signal with N/2 points and the seventh signal with N/2 points comprises:
summing up, by the transmitting communication apparatus, values of the fifth signal with N/2 points and values of the seventh signal with N/2 points, to obtain a signal with N/2 points comprised in the eleventh signal with N/2 points.

5. A method for transmitting a first frequency domain signal with N points of an orthogonal frequency division multiplexing (OFDM) signal from a transmitting communication apparatus to a receiving communication apparatus and for ensuring that a baseband signal of the OFDM signal is a non-negative real number, the method comprising:
receiving, by the receiving communication apparatus, a signal with 3N/2 points, wherein receiving the signal with 3N/2 points comprises:
receiving, by the receiving communication apparatus-device, a twelfth signal with 3N/2 points, the twelfth signal comprising 3N/2 values corresponding to the 3N/2 points, and the 3N/2 values being indexed with i =0, . . . , 3N/2-1, wherein N is a positive even integer; and
generating, by the receiving communication apparatus, a nineteenth signal with N/2 points and a twentieth signal with N points by separating first N/2 points and last N points of the twelfth signal;
determining, by the receiving communication apparatus, based on the received signal with 3N/2 points, two groups of signals obtained by separating the first signal with N points, wherein the determining comprises:
generating, by the receiving communication apparatus, a second signal with N points based on the twentieth signal with N points; and
generating, by the receiving communication apparatus, a third signal with N points based on the twentieth signal with N points, the second signal with N points and the nineteenth signal with N/2 points; and
restoring, by the receiving communication apparatus, a first signal with N points based on the two groups of signals, wherein the restoring comprises:
generating, by the communication apparatus, the first signal with N points based on the second signal with N points and the third signal with N points.

6. The method according to claim 5, wherein the twelfth signal with 3N/2 points comprises an eighth signal with N/2 points, a ninth signal with N/2 points and a seventh signal with N/2 points, and generating the nineteenth signal with N/2 points and the twentieth signal with N points comprises:
separating the twelfth signal with 3N/2 points, to obtain a fifteenth signal with N points and the seventh signal with N/2 points, wherein the fifteenth signal with N points comprises the eighth signal with N/2 points and the ninth signal with N/2 points;
generating the second signal with N points based on the twentieth signal with N points comprises:
generating the second signal with N points based on the fifteenth signal with N points; and
generating the third signal with N points based on the twentieth signal with N points, the second signal with N points and the nineteenth signal with N/2 points comprises:
generating a fourth signal with N/2 points or a fifth signal with N/2 points based on the second signal with N points;
generating a sixth signal with N/2 points based on the fourth signal with N/2 points or the fifth signal with N/2 points, and the fifteenth signal with N points; and
generating the third signal with N points based on the seventh signal with N/2 points and the sixth signal with N/2 points.

7. The method according to claim 6, wherein generating the second signal with N points based on the fifteenth signal with N points comprises:
performing inverse fast fourier transform (IFFT) or fast fourier transform (FFT) on the fifteenth signal with N points, to obtain a sixteenth signal with N points; and
setting each value of the sixteenth signal with N points with an even index to 0, to obtain the second signal with N points.

8. The method according to claim 6, wherein generating the third signal with N points based on the seventh signal with N/2 points and the sixth signal with N/2 points comprises:
determining a fourteenth signal with N points based on the seventh signal with N/2 points and the sixth signal with N/2 points; and
performing inverse fast fourier transform (IFFT) or fast fourier transform (FFT) on the fourteenth signal with N points, to obtain the third signal with N points.

9. The method according to claim 5, wherein the twelfth signal with 3N/2 points comprises a tenth signal with N/2 points, a eleventh signal with N/2 points and a sixth signal with N/2 points, and generating the nineteenth signal with N/2 points and the twentieth signal with N points comprises:
- separating the twelfth signal with 3N/2 points, to obtain a seventeenth signal with N points and the sixth signal with N/2 points, wherein the seventeenth signal with N points comprises the tenth signal with N/2 points and the eleventh signal with N/2 points;
- generating the second signal with N points based on the twentieth signal with N points comprises:
  - generating the second signal with N points based on the seventeenth signal with N points; and
- generating the third signal with N points based on the twentieth signal with N points, the second signal with N points and the nineteenth signal with N/2 points comprises:
  - generating a fourth signal with N/2 points or a fifth signal with N/2 points based on the second signal with N points;
  - generating the seventh signal with N/2 points based on the fourth signal with N/2 points or the fifth signal with N/2 points, and the seventeenth signal with N points; and
  - generating the third signal with N points based on the seventh signal with N/2 points and the sixth signal with N/2 points.

10. The method according to claim 9, wherein generating the second signal with N points based on the seventeenth signal with N points comprises:
- performing inverse fast fourier transform (IFFT) or fast fourier transform (FFT) on the seventeenth signal with N points, to obtain an eighteenth signal with N points; and
- setting each value of the seventeenth signal with N points with an even index to 0, to obtain the second signal with N points.

11. The method according to claim 9, wherein generating the third signal with N points based on the seventh signal with N/2 points and the sixth signal with N/2 points comprises:
- determining a fourteenth signal with N points based on the seventh signal with N/2 points and the sixth signal with N/2 points; and
- performing inverse fast fourier transform (IFFT) or fast fourier transform (FFT) on the fourteenth signal with N points, to obtain the third signal with N points.

12. A communication apparatus for transmitting a first frequency domain signal with N points of an orthogonal frequency division multiplexing (OFDM) signal from a transmitting communication apparatus to a receiving communication apparatus and for ensuring that a baseband signal of the OFDM signal is a non-negative real number, the communication apparatus comprising:
- a processor, wherein the processor is coupled to a non-transitory memory storing a computer program or instructions, that when executed by the processor, cause the communication apparatus to:
- obtain a first signal with N points, wherein N is a positive even integer, the first signal with N points comprising N values corresponding to the N points respectively, and the N values being indexed with i=0, . . . , N−1;
- separate the first signal with N points, to obtain two groups of signals, wherein the two groups of signals meet symmetry or antisymmetry after fast fourier transform (FFT) or inverse FFT (IFFT), and separating the first signal with N points comprises causing the communicatino apparatus to:
  - determine a second signal with N points and a third signal with N points based on the first signal with N points, wherein the second signal with N points is generated by setting each value of the first signal with an even index to 0, and the third signal with N points is generated by setting each value of the first signal with an odd index to 0; and
  - generate an eighth signal with N/2 points based on a fourth signal with N/2 points and a sixth signal with N/2 points, and generate a ninth signal with N/2 points based on a fifth signal with N/2 points and the sixth signal with N/2 points, wherein the fourth signal with N/2 points and the fifth signal with N/2 points are determined based on the second signal with N points, and the sixth signal with N/2 points and a seventh signal with N/2 points are determined based on the third signal with N points; or generate a tenth signal with N/2 points based on the fourth signal with N/2 points and the seventh signal with N/2 points, and generate an eleventh signal with N/2 points based on the fifth signal with N/2 points and the seventh signal with N/2 points;
- combine the two groups of signals obtained through separation, to obtain a to-be-sent signal with 3N/2 points; and
- send the to-be-sent signal with 3N/2 points, to enable the receiver to restore the first signal with N points from the transmitted signal with 3N/2 points, wherein sending the signal with 3N/2 points comprises causing the communication apparatus to:
  - send a twelfth signal with 3N/2 points, wherein the twelfth signal with 3N/2 points comprises the eighth signal with N/2 points, the ninth signal with N/2 points, and the seventh signal with N/2 points, or the twelfth signal with 3N/2 points comprises the tenth signal with N/2 points, the eleventh signal with N/2 points, and the sixth signal with N/2 points.

13. The communication apparatus according to claim 12, the computer program or instructions, when executed by the processor, further cause the communication apparatus to:
- perform IFFT or FFT on the second signal with N points, to obtain a thirteenth signal with N points, wherein
- the fourth signal with N/2 points is generated by including positive values of first N/2 points of the thirteenth signal and setting negative values of the first N/2 points of the thirteenth signal with N points to 0, or by setting positive values of last N/2 points of the thirteenth signal with N points to 0 and calculating absolute values of negative values of the last N/2 points of the thirteenth signal with N points; and
- the fifth signal with N/2 points is generated by setting positive values of the first N/2 points of the thirteenth signal with N points to 0 and calculating absolute values of the negative values of the first N/2 points of the thirteenth signal with N points, or by including the positive values of the last N/2 points of the thirteenth signal and setting the negative values of the last N/2 points of the thirteenth signal with N points to 0.

14. The communication apparatus according to claim 12, the computer program or instructions, when executed by the processor, further cause the communication apparatus to:
- perform IFFT or FFT on the third signal with N points, to obtain a fourteenth signal with N points, wherein the sixth signal with N/2 points is generated by setting negative values of first N/2 points or last N/2 points of the fourteenth signal with N points to 0; and the seventh signal with N/2 points is generated by setting positive values of the first N/2 points or the last N/2 points of the fourteenth signal with N points to 0 and calculating absolute values of the negative values of the first N/2 points or the last N/2 points of the fourteenth signal with N points.

15. The communication apparatus according to claim 12, the computer program or instructions when executed by the processor, cause the communication apparatus to:

sum up a signal values of the fourth signal with N/2 points and values of the sixth signal with N/2 points according to their corresponding indexes, to obtain a signal with N/2 points comprised in the eighth signal with N/2 points;

sum up values of the fifth signal with N/2 points and values of the sixth signal with N/2 points according to their corresponding indexes, to obtain a signal with N/2 points comprised in the ninth signal with N/2 points;

sum up values of the fourth signal with N/2 points and values of the seventh signal with N/2 points according to their corresponding indexes, to obtain a signal with N/2 points comprised in the tenth signal with N/2 points; or sum up values of the fifth signal with N/2 points and values of the seventh signal with N/2 points according to their corresponding indexes, to obtain a signal with N/2 points comprised in the eleventh signal with N/2 points.

16. The communication apparatus according to claim 12, wherein the memory is integrated into the processor.

17. The communication apparatus according to claim 12, wherein the communication apparatus is a chip.

18. The communication apparatus according to claim 12, wherein the communication apparatus further comprises a communication interface configured for sending the twelfth signal with 3N/2 points.

* * * * *

UNITED STATES PATENT AND TRADEMARK OFFICE
CERTIFICATE OF CORRECTION

| | | |
|---|---|---|
| PATENT NO. | : 12,184,330 B2 | Page 1 of 1 |
| APPLICATION NO. | : 17/986492 | |
| DATED | : December 31, 2024 | |
| INVENTOR(S) | : Li et al. | |

It is certified that error appears in the above-identified patent and that said Letters Patent is hereby corrected as shown below:

In the Claims

In Column 43, in Claim 3, Line 3, delete "transmitting_communication" and insert -- transmitting communication --.

In Column 43, in Claim 4, Line 28, delete "transmitting_communication" and insert -- transmitting communication --.

In Column 43, in Claim 4, Line 37, delete "transmitting_communication" and insert -- transmitting communication --.

In Column 43, in Claim 5, Lines 60-61, delete "apparatusdevice," and insert -- apparatus, --.

Signed and Sealed this
Eighteenth Day of February, 2025

Coke Morgan Stewart
*Acting Director of the United States Patent and Trademark Office*